United States Patent
Dingman et al.

(10) Patent No.: US 7,246,854 B2
(45) Date of Patent: Jul. 24, 2007

(54) CHILD VEHICLE SEAT HAVING AN ADJUSTABLE HARNESS SYSTEM

(75) Inventors: Guy Dingman, Westfield, IN (US); Mike Ayette, Noblesville, IN (US); Tom Woellert, Indianapolis, IN (US)

(73) Assignee: Indiana Mills & Manufacturing Inc, Westfield, IN (US)

( * ) Notice: Subject to any disclaimer, the term of this patent is extended or adjusted under 35 U.S.C. 154(b) by 41 days.

(21) Appl. No.: 11/250,331

(22) Filed: Oct. 14, 2005

(65) Prior Publication Data

US 2006/0082199 A1    Apr. 20, 2006

Related U.S. Application Data

(60) Provisional application No. 60/718,458, filed on Sep. 19, 2005, provisional application No. 60/619,182, filed on Oct. 15, 2004.

(51) Int. Cl.
*B60N 2/28* (2006.01)
(52) U.S. Cl. .............. 297/250.1; 297/467; 297/484
(58) Field of Classification Search ........... 297/250.1, 297/467, 484, 410
See application file for complete search history.

(56) References Cited

U.S. PATENT DOCUMENTS

| | | | |
|---|---|---|---|
| 4,429,916 A * | 2/1984 | Hyde et al. ............ 297/256.15 |
| 4,770,468 A | 9/1988 | Shubin | |
| 4,886,315 A | 12/1989 | Johnson | |
| 5,292,176 A * | 3/1994 | Artz ................... 297/250.1 |
| 5,383,708 A | 1/1995 | Nagasaka et al. | |
| 5,472,260 A * | 12/1995 | Czapski et al. ............ 297/467 |
| 5,527,094 A | 6/1996 | Hiramatsu et al. | |
| 5,605,375 A | 2/1997 | Friedrich et al. | |
| 5,681,094 A | 10/1997 | Brown et al. | |
| 5,839,789 A | 11/1998 | Koledin | |
| 5,957,531 A | 9/1999 | Kane et al. | |
| 6,030,047 A | 2/2000 | Kain | |
| 6,048,028 A | 4/2000 | Bapst | |
| 6,089,662 A * | 7/2000 | Lambert et al. ............ 297/238 |
| 6,189,970 B1 | 2/2001 | Rosko | |
| 6,338,529 B1 | 1/2002 | David et al. | |
| 6,457,774 B2 | 10/2002 | Baloga | |
| 6,471,298 B2 | 10/2002 | Carine et al. | |
| 6,491,348 B1 | 12/2002 | Kain | |
| 6,588,849 B2 | 7/2003 | Glover et al. | |
| 6,592,183 B2 | 7/2003 | Kain | |

(Continued)

FOREIGN PATENT DOCUMENTS

WO    WO 2005/000625    1/2005

*Primary Examiner*—Peter R. Brown
(74) *Attorney, Agent, or Firm*—Woodard, Emhardt, Moriarty, McNett & Henry LLP

(57) ABSTRACT

A child vehicle seat includes a seat portion and a headrest assembly. The headrest assembly defines at least one belt aperture. The headrest assembly is movable in relation to the seat portion between an upper position and a lower position. The child vehicle seat further includes a harness system including (i) at least one shoulder belt portion extending through the at least one belt aperture defined in the headrest assembly, and (ii) a crotch belt assembly that is movable in relation to the seat portion between an extended position and a retracted position. Movement of the headrest assembly in relation to the seat portion from the upper position to the lower position causes the crotch belt assembly to move from the extended position to the retracted position.

18 Claims, 37 Drawing Sheets

U.S. PATENT DOCUMENTS

| | | |
|---|---|---|
| 6,623,074 B2 | 9/2003 | Asbach et al. |
| 6,659,564 B2 | 12/2003 | Kassai et al. |
| 6,665,912 B2 | 12/2003 | Turner et al. |
| 6,672,663 B2 | 1/2004 | Kain |
| 6,688,685 B2 | 2/2004 | Kain |
| 6,698,841 B1 | 3/2004 | Glover et al. |
| 6,779,843 B2 | 8/2004 | Kain |
| 6,820,939 B1 | 11/2004 | Chen |
| 6,893,088 B2 | 5/2005 | Kassai et al. |
| 7,077,475 B2 * | 7/2006 | Boyle .................. 297/250.1 |
| 2002/0195867 A1 | 12/2002 | Barger et al. |
| 2004/0004379 A1 | 1/2004 | Kassai |
| 2004/0084939 A1 | 5/2004 | Boyle |
| 2004/0090094 A1 | 5/2004 | Williams |
| 2004/0251722 A1 | 12/2004 | Boyle |

* cited by examiner

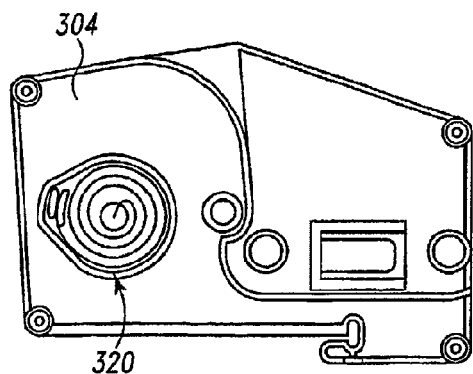 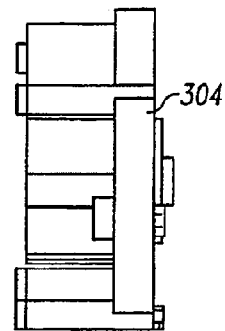
Fig. 19A  Fig. 19B
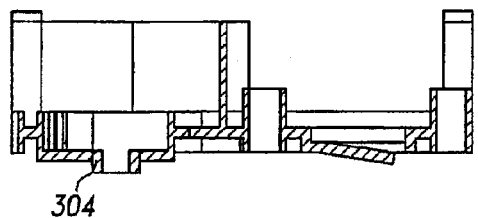
Fig. 19C

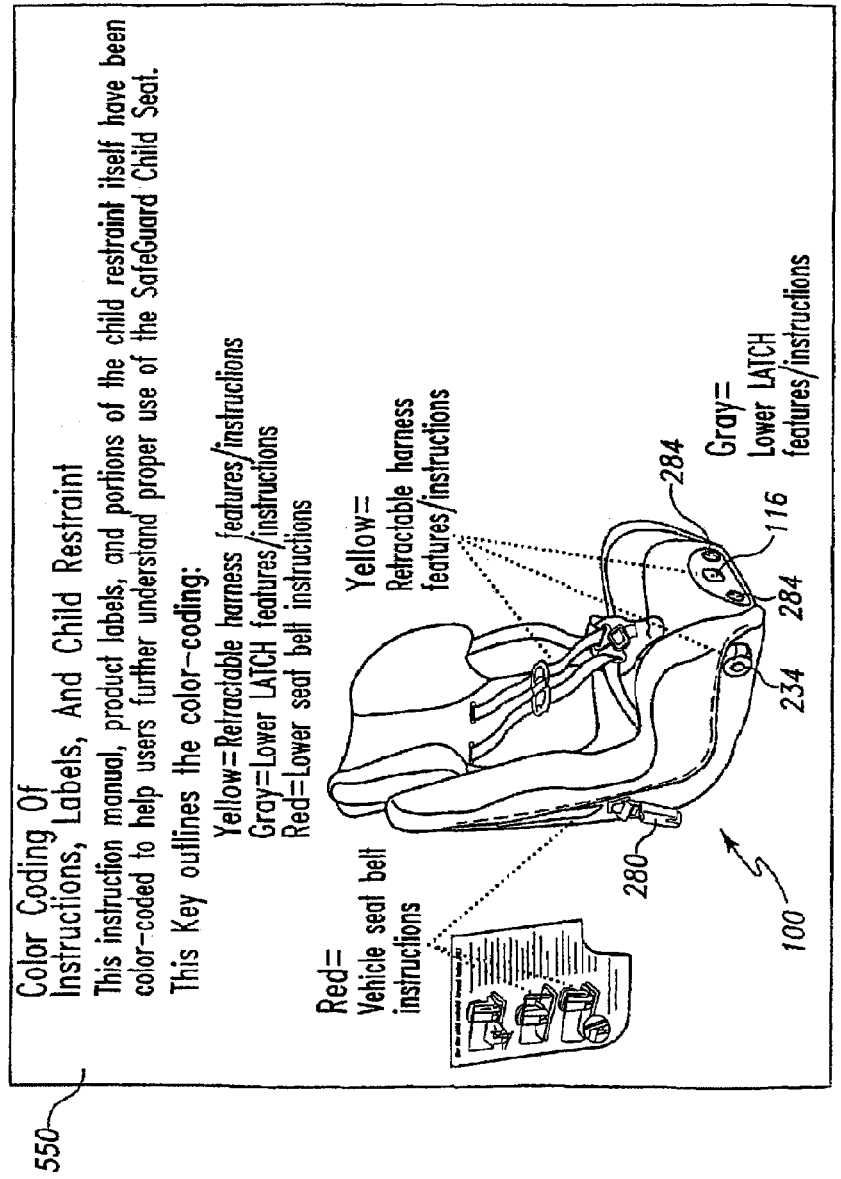

CHILD VEHICLE SEAT HAVING AN ADJUSTABLE HARNESS SYSTEM

This application claims the benefit of both (i) U.S. Provisional Application Ser. No. 60/619,182, filed Oct. 15, 2004, and (ii) U.S. Provisional Application Ser. No. 60/718,458, filed Sep. 19, 2005. The disclosure of both of the above-identified provisional patent applications are hereby totally incorporated by reference in their entirety.

BACKGROUND

This invention relates to the field of child seats for motor vehicles.

Child seats for motor vehicles are widely used by operators of motor vehicles to protect children from harm in the event of an accident. Child seats generally include a plastic shell with a cushioned seat formed over the shell. A harness is provided on the seat to restrain the child and retain the child in the seat in the event of an accident. Harness systems typically include a shoulder harness with belts designed to extend over the shoulders of the child and a buckle harness with a crotch belt designed to extend between the legs of the child. The belts included with the harness system can typically be adjusted in length to accommodate children of different sizes.

A continuing challenge for users of conventional child vehicle seats and restraint systems is properly positioning the harness upon the child. In particular, the shoulder belts included with the shoulder harness should extend from the back of the seat within a specified range of the child's shoulder. In addition, the crotch belt of the buckle harness should extend from the bottom of the seat within a specified range of the child's crotch. Furthermore, the buckle of the buckle harness should be properly positioned within a specific range near the midsection of the child. Users of child seats are often required to make various adjustments to the harness such that all belts and buckles are properly situated for the child that will be using the seat. Therefore, a need exists for a child seat where the shoulder harness and buckle harness are easily and/or automatically adjusted, depending upon the size of the child. Furthermore, a need exists for a child seat where the position of the belts with respect to the seat may be changed depending upon the size of the child. Preferably, this would include automatically changing the position of the shoulder belt with respect to the back of the seat and automatically changing position of the crotch belt with respect to the seat bottom, depending upon the size of the child.

Another challenge for users of conventional child seat designs is the relative complexity of the headrest and shoulder harness adjustment for the seat. The headrest and shoulder harness positions should typically be adjusted as the child grows. However, the adjustment mechanisms for the headrest and/or shoulder harness can be awkward and difficult to manipulate on many seats. Therefore, it would be desirable to provide a headrest mechanism for a child seat that is easy to adjust. It would also be desirable to provide a harness system that is automatically adjusted when the headrest is adjusted, thereby relieving users of the need to readjust the harness after moving the headrest.

SUMMARY OF THE INVENTION

In accordance with one embodiment of the present invention, there is provided a child vehicle seat that includes a seat portion and a headrest assembly. The headrest assembly defines at least one belt aperture. The headrest assembly is movable in relation to the seat portion between an upper position and a lower position. The child vehicle seat further includes a harness system including (i) at least one shoulder belt portion extending through the at least one belt aperture defined in the headrest assembly, and (ii) a crotch belt assembly that is movable in relation to the seat portion between an extended position and a retracted position. Movement of the headrest assembly in relation to the seat portion from the upper position to the lower position causes the crotch belt assembly to move from the extended position to the retracted position.

In accordance with another embodiment of the present invention, there is provided a child vehicle seat that includes a seat portion and a headrest assembly that is movable in relation to the seat portion, the headrest assembly defining at least one belt aperture. The child vehicle seat further includes a harness system including (i) at least one shoulder belt extending through the at least one belt aperture defined in the headrest assembly, and (ii) a crotch belt that is movable in relation to the seat portion Movement of the headrest assembly in relation to the seat portion causes movement of the crotch belt in relation to the seat portion.

BRIEF DESCRIPTION OF THE DRAWINGS

FIG. 19A shows a cross-sectional view of the belt retractor of FIG. 17;

FIG. 19B shows a rear elevational view of the belt retractor of FIG. 19A;

FIG. 19C is a cross-sectional view of the belt retractor taken along the line A-A of FIG. 19A;

FIG. 32 shows a page of an instruction manual for the child vehicle seat of FIG. 1.

DESCRIPTION

Overview

Figure 1:
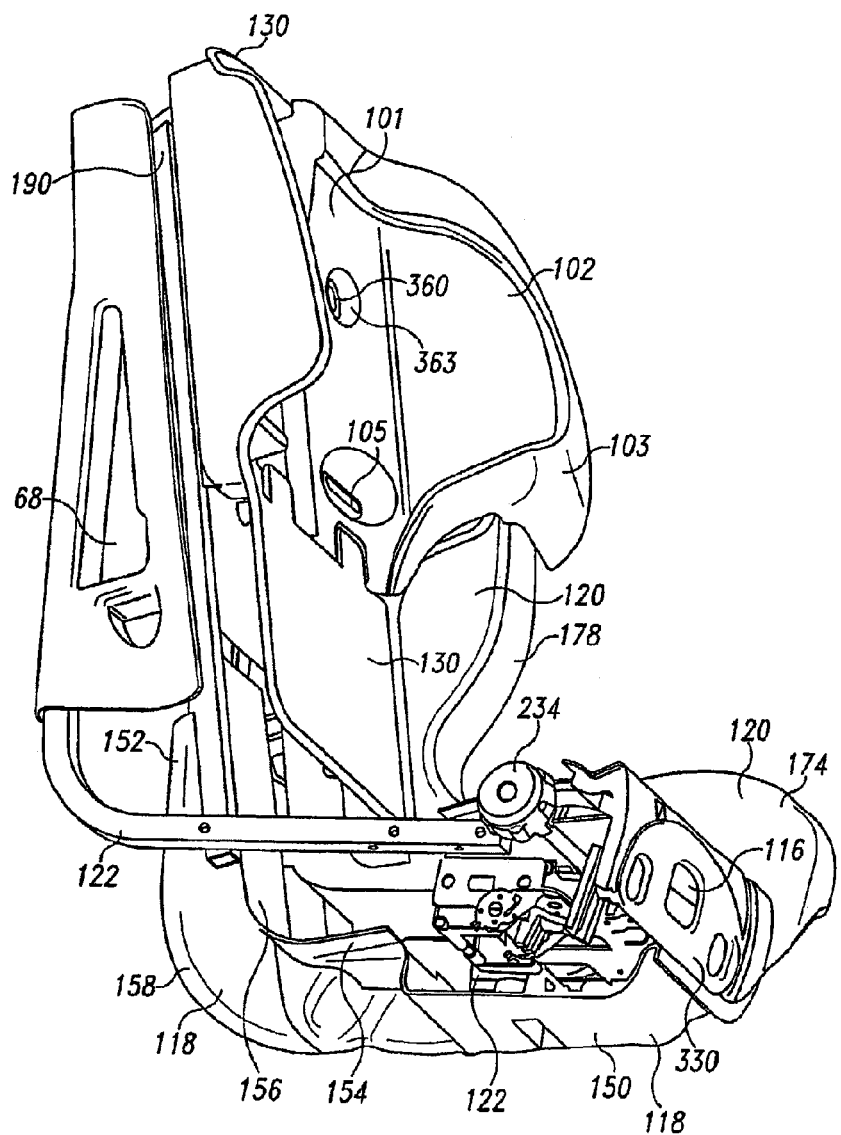
FIG. 1 shows a partial cutaway perspective side view of a child vehicle seat and restraint system.

With general reference to FIG. 1, a child's vehicle seat and restraint system 100 comprises a seat portion 104 and a headrest 102. The seat portion 104 of the child seat 100 includes a base shell 118 which is secured to the posterior side of a rigid frame 122. A foam shell 120 is secured to the base shell 118 and covers the anterior side of the rigid frame. The headrest 102 is attached to an adjustable headrest support 130 which is slideably retained upon the frame.

Figure 12:
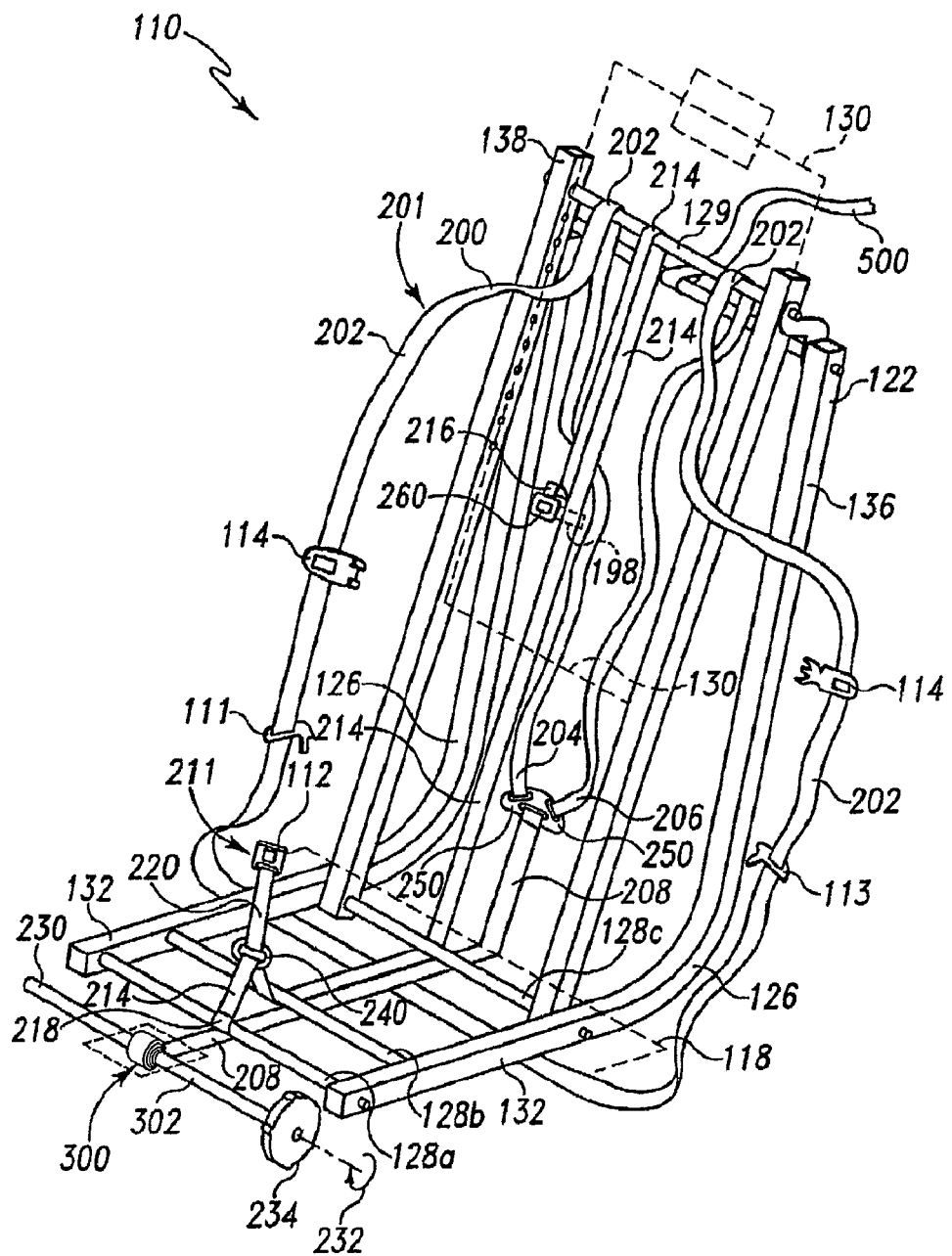
FIG. 12 shows the harness arrangement in relation to the frame for the child vehicle seat of FIG. 1.

As shown in FIG. 12, the child seat 100 also includes a harness 110 which is designed to secure an occupant within the seat. The harness 110 includes a plurality of straps that form a web 200 used to secure a child in the seat. The harness 110 also includes a front buckle 112 and a front clip 114 used to properly position the harness straps upon the child. A central belt retractor 300 is secured to the rigid frame 122 and is operable to remove slack in the harness once a child occupant is positioned in the child seat 100.

Frame

Figure 2:
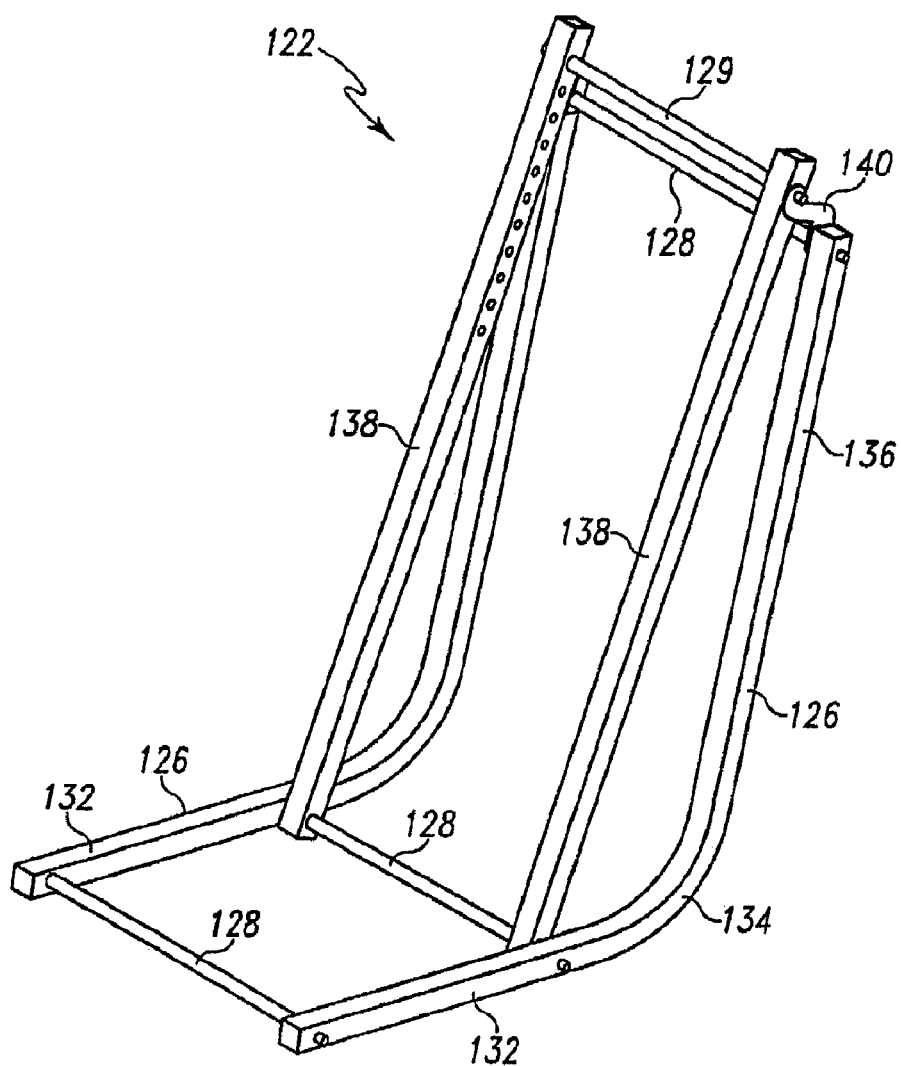
FIG. 2 shows a perspective view of a frame of the child vehicle seat of FIG. 1.

With reference to FIG. 2, the frame 122 of the child seat includes two L-shaped members 126 separated by a plurality of metallic cross members 128 that extend between the L-shaped members 126. The cross members 128 extend through holes defined in the L-shaped members 126 and are fastened to the L-members using means commonly used in the art, such as welding or nuts and bolts. Each L-shaped member includes a short leg 132, a curved portion 134, and a long leg 136. Two parallel support bars 138 are also included in the frame. Each support bar 138 includes a first end connected to the short leg 132 of one of the L-shaped members 126 and a second end that extends toward the top of the long leg 136 of the same L-shaped member 126. An S-shaped plate 140 connects the second end of each support member to the long leg 136 of the L-shaped member 126. One of the cross members 128 extends through the first end of the support bars 138 to secure the support bars to the short legs 132 of the L-shaped members 126. An additional metallic cross member 129 is provided that extends between the support bars 138 and through the S-shaped plates. The rigid frame 122 is made of a lightweight metallic material, such as aluminum.

The frame 122 generally provides a strong skeletal structure for the child seat 100 to which all load bearing components on the child seat are attached. Because the frame 122 is comprised of a metal material, the frame provides a stable support that resists cracking and/or breaking. With this arrangement, force is directed away from the occupant of the child seat in the event of a crash.

Base Shell

Figure 3:
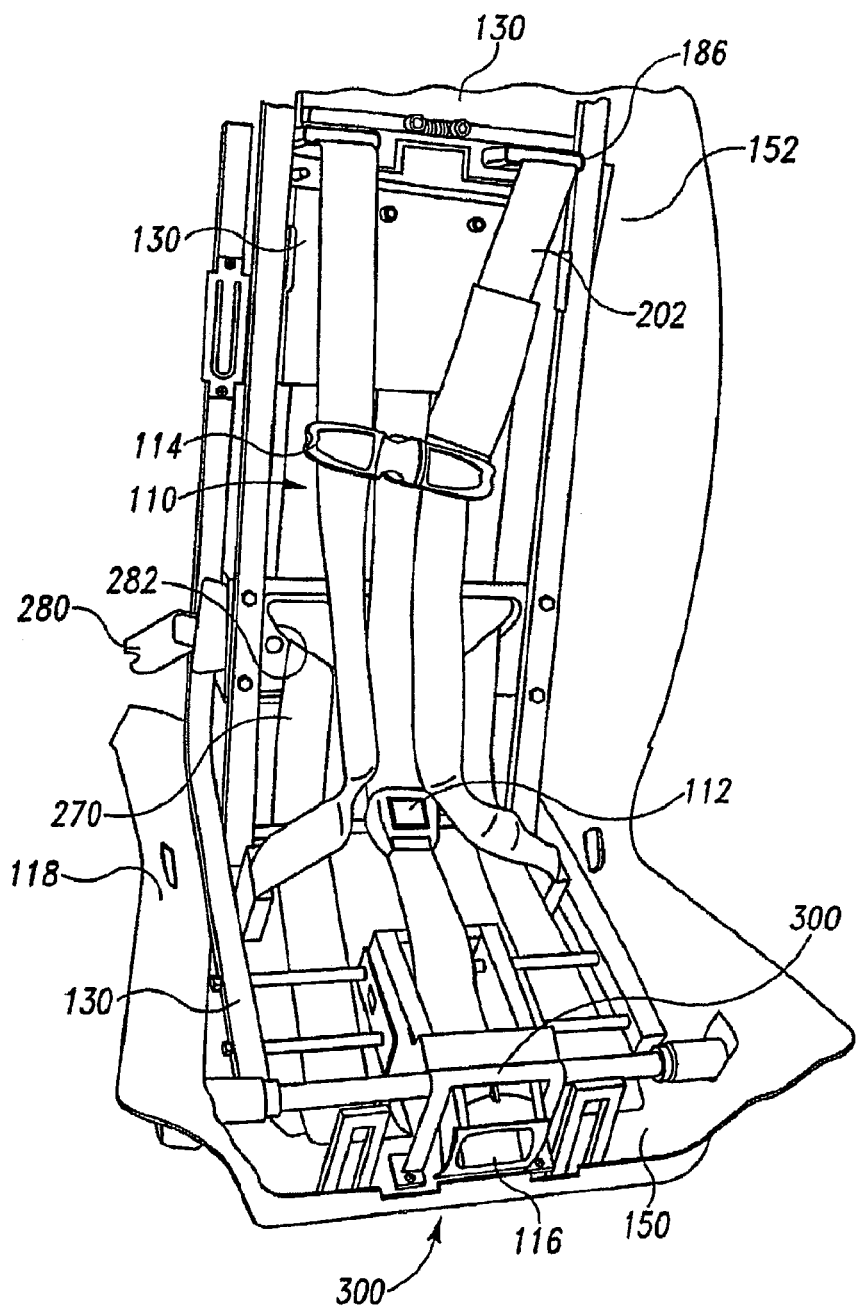
FIG. 3 shows a front perspective view of the child vehicle seat of FIG. 1 with the seat cover and foam shell removed.

With reference to FIGS. 1 and 3, the base shell 118 cradles the frame 122 about the posterior side of the frame 122. To this end, the profile of the base shell 118 is generally L-shaped, similar the L-shaped members 126 of the frame 122. The base shell 118 is made of a relatively stiff plastic material, such as polypropylene. The base shell 118 includes a bottom portion 150 designed to receive the short legs 132 of the frame 122, and a back portion 152 designed to receive the long legs 136 of the frame 122. The frame 122 is secured to the base shell 118 in any means commonly used in the art such as rivets, nuts and bolts, or other fasteners.

Figure 4:
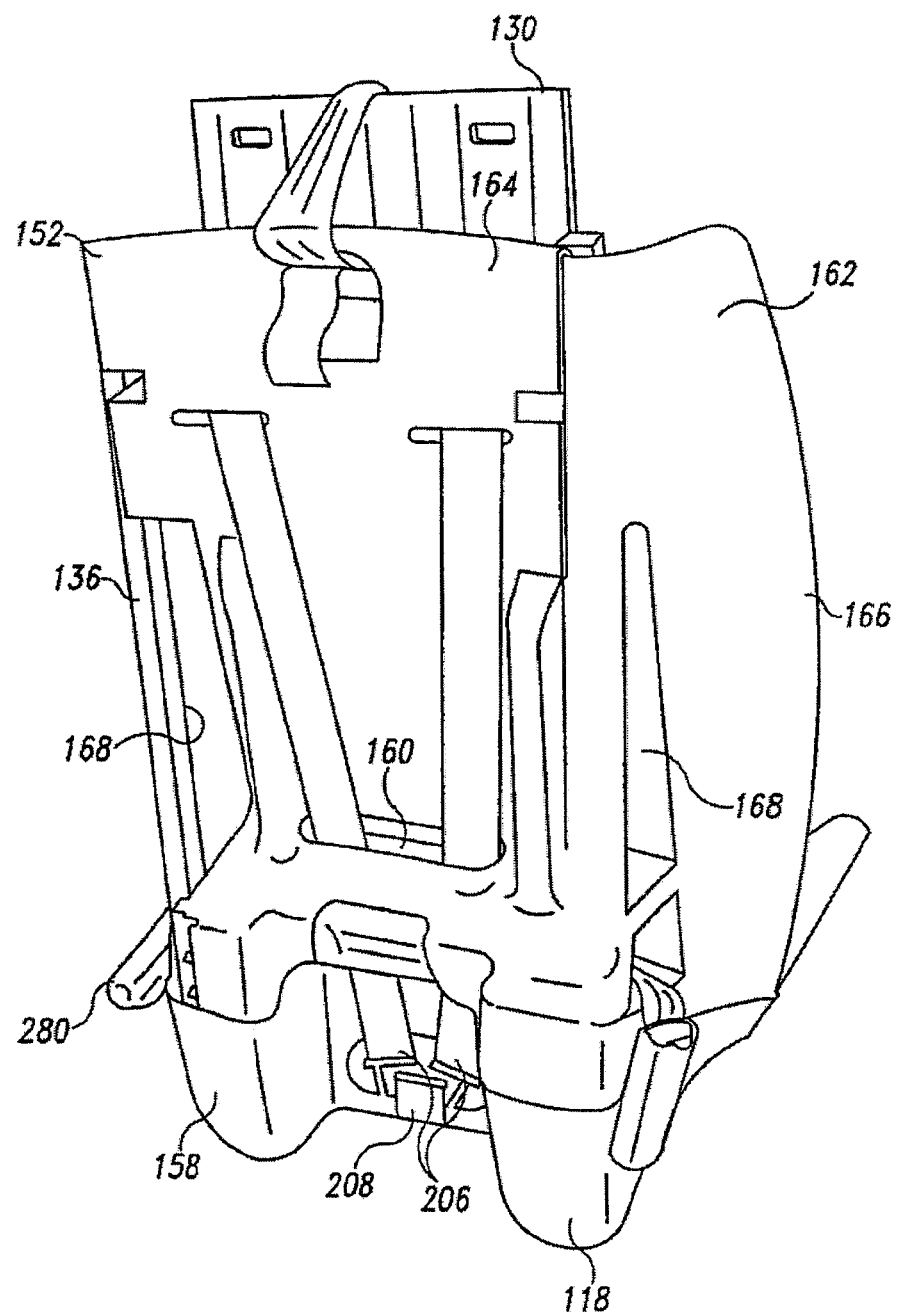
FIG. 4 shows a rear perspective view of the child vehicle seat of FIG. 1 with the headrest and seat cover removed.
Figure 5:
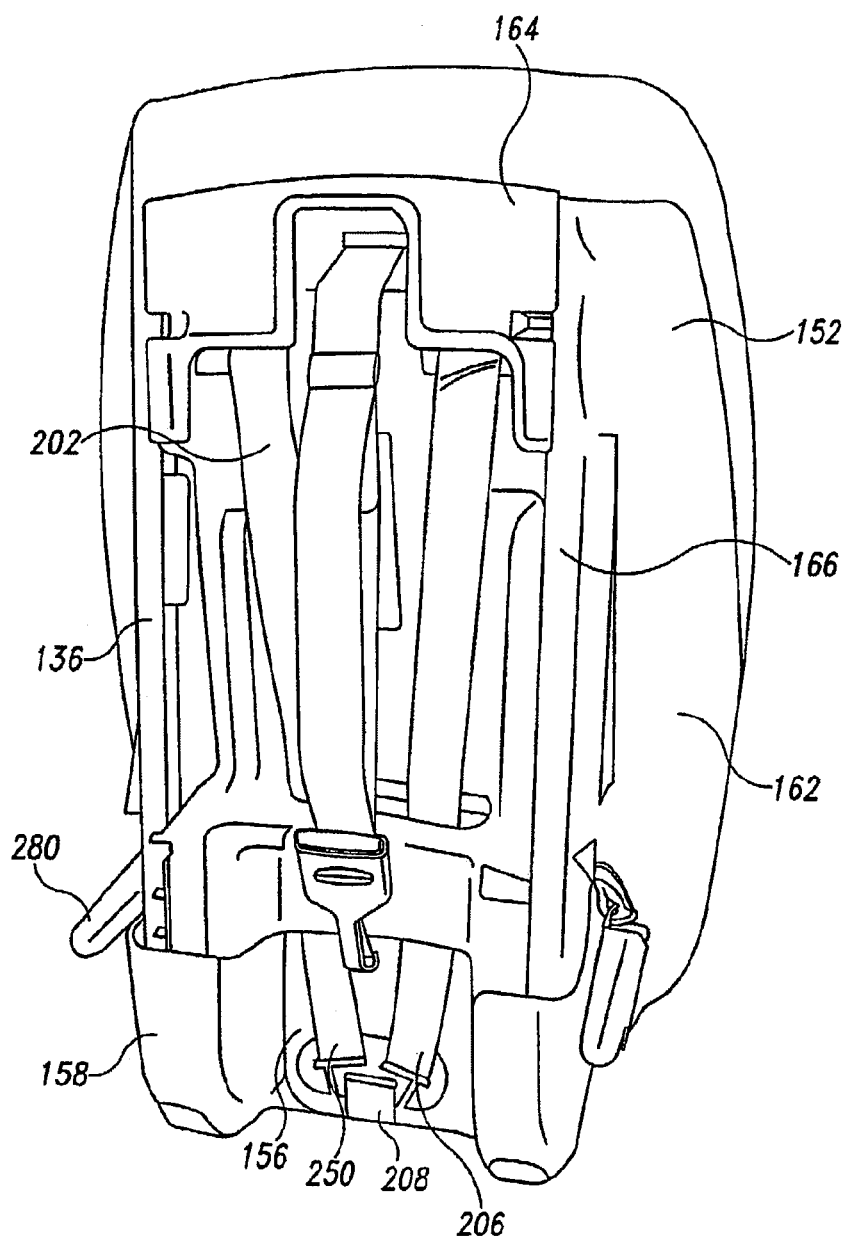
FIG. 5 shows a rear view of the child vehicle seat of FIG. 1.

As shown in FIGS. 4 and 5, the back portion 152 of the base shell 118 includes a recessed angled panel 156 positioned between two rear heels 158. A window 160 is formed in the back portion 152 above the recessed angled panel 156. The window 160 is flanked by two side wings 162. A top panel 164 is formed above the window 160 and extends between the two side wings 162. Two columns 166 extend from the top panel 164 down to the heels 158. The two columns 166 partially surround the long legs 136 of the L-shaped members 126 of the frame 122. Triangular openings 168 are formed between the wings 162, columns 166 and heels 158, as shown in FIG. 4.

Figure 25:
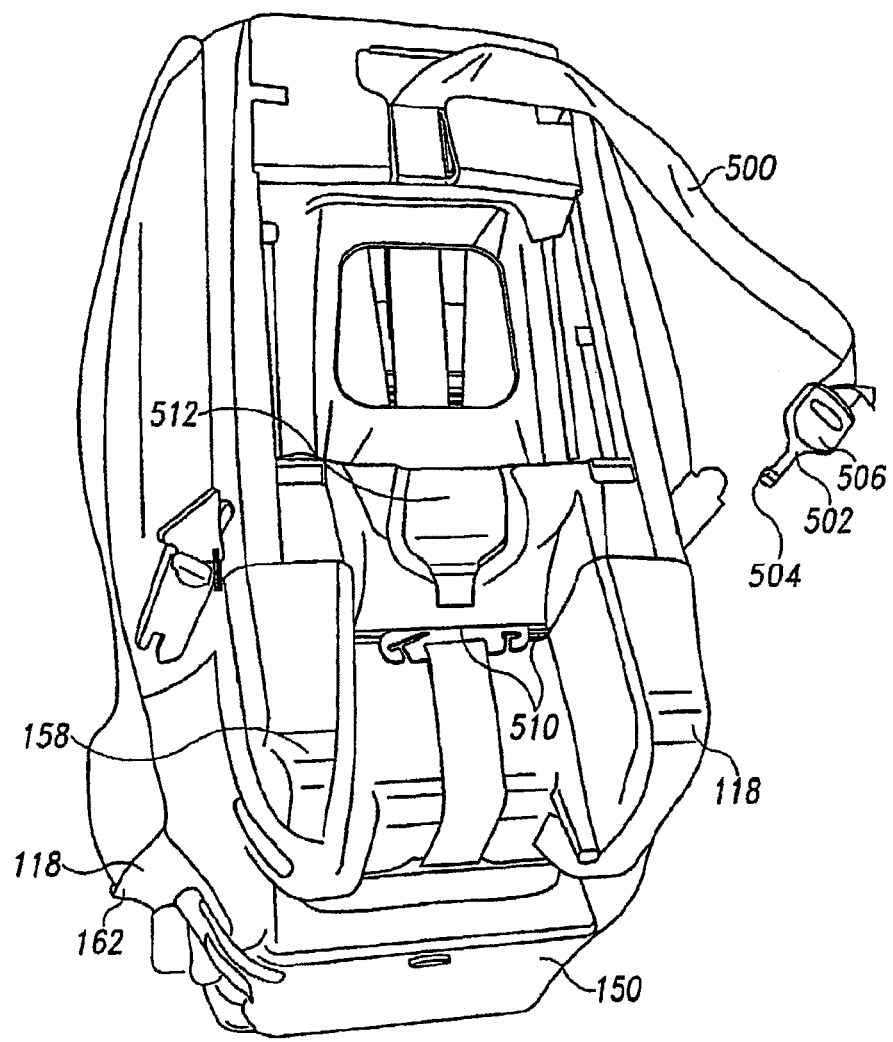
FIG. 25 shows a rear perspective view of the child vehicle seat of FIG. 1 including a carrying strap.
Figure 25A:
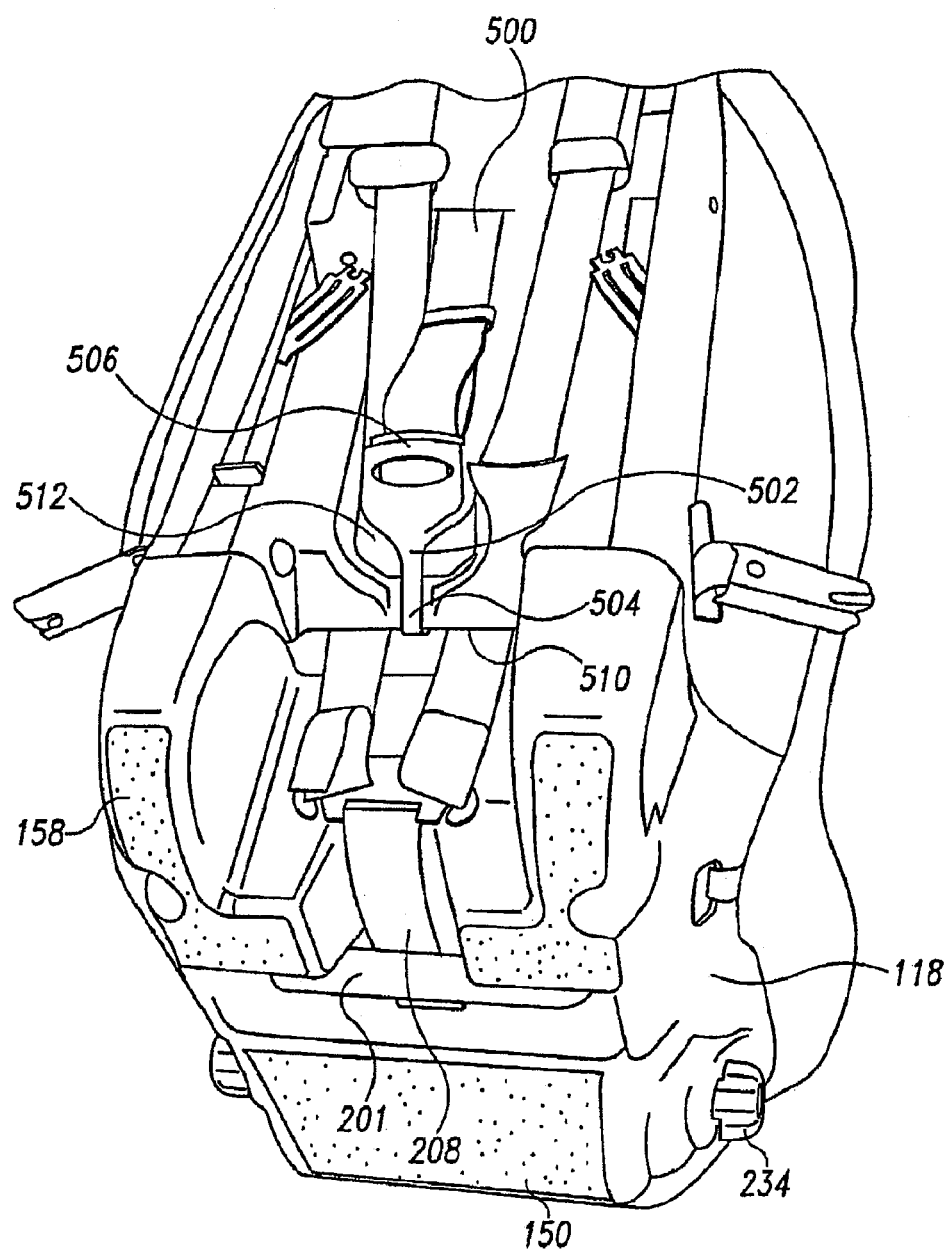
FIG. 25A shows a rear perspective view of an alternative embodiment of the child seat in relation to the embodiment shown in FIG. 25, with the alternative embodiment including an anti-skid material adhered or otherwise affixed to the bottom surface of the bottom portion of the base shell of the child seat.
Figure 26:
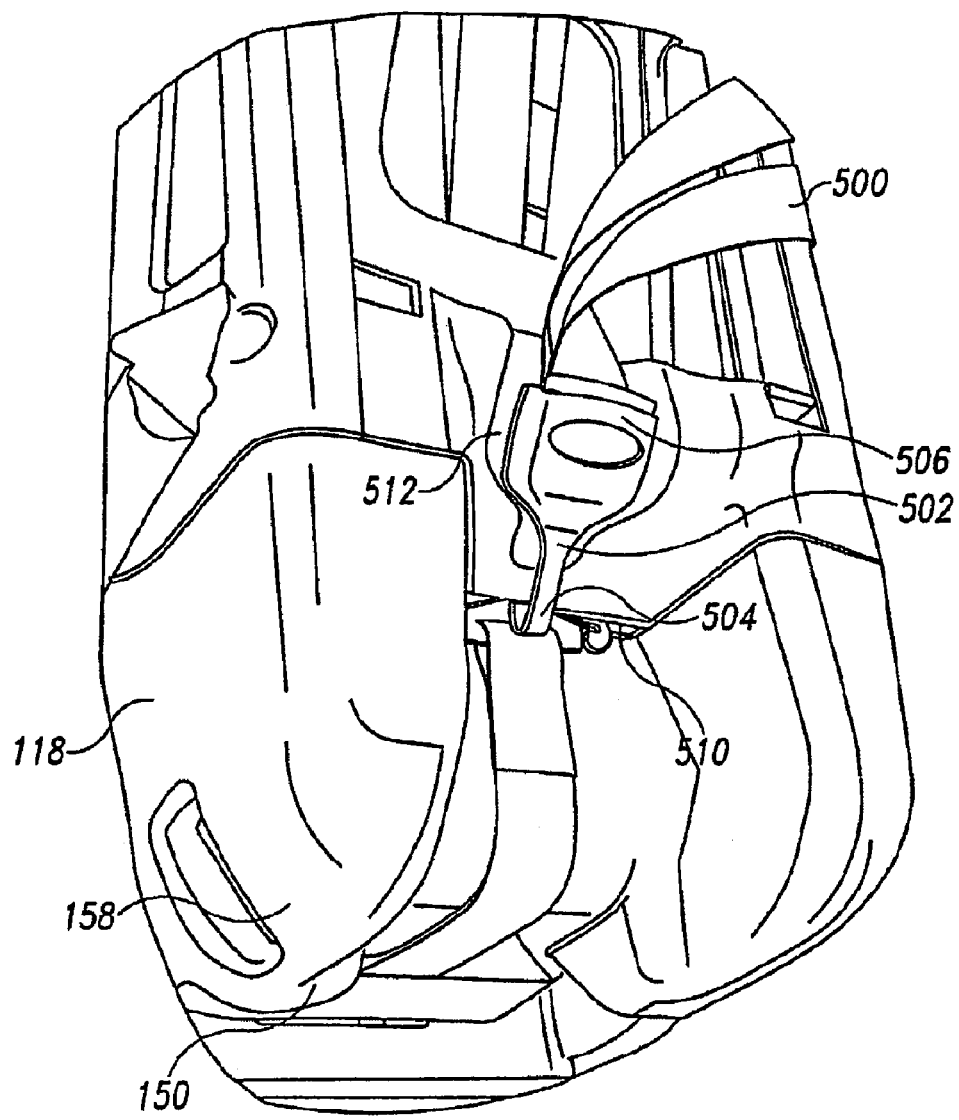
FIG. 26 shows a rear perspective view of the child vehicle seat of FIG. 25 with the carrying strap hooked to the vehicle seat.

The bottom portion 150 of the base shell 118 includes a generally flat portion designed to provide a surface for the base shell that rests upon the vehicle seat. The bottom portion 150 of the base shell is best seen in FIGS. 25 and 26. Anti-skid material may be adhered or otherwise affixed to the bottom surface of the bottom portion 150 of the base shell to discourage the base shell from moving when it is placed in a vehicle seat as shown in an alternative embodiment depicted in FIG. 25A. The anti-skid material is generally a resilient material such as rubber or soft plastic and is textured to provide additional gripping ability on a vehicle seat.

Figure 14:
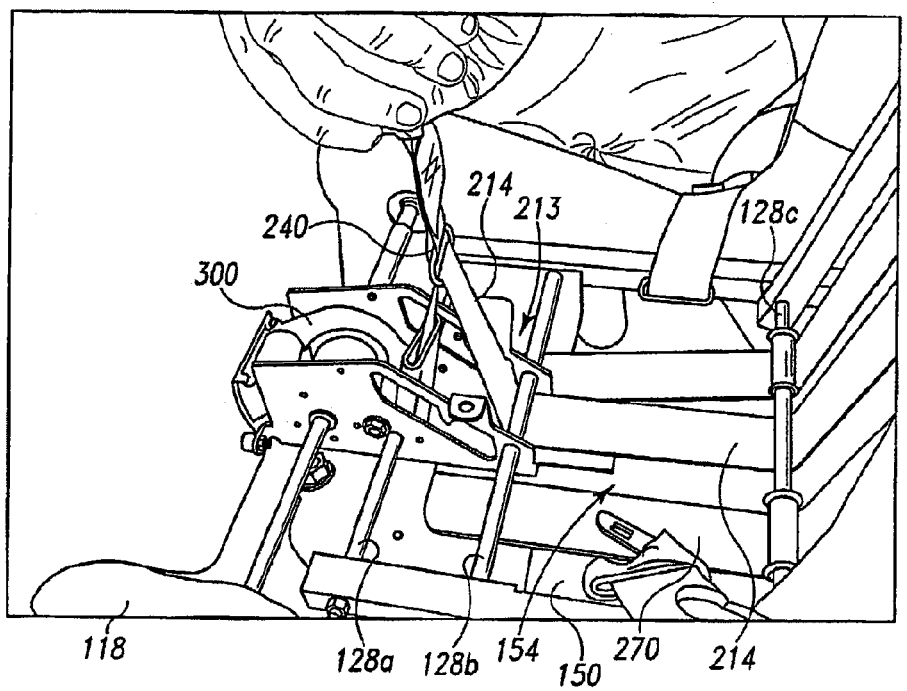
FIG. 14 shows a top perspective view of the child vehicle seat of FIG. 13 with a crotch strap in an extended position.

The two rear heels 158 also blend into the bottom portion 150 of the base shell and provide additional support for the base shell when it is placed in the vehicle seat. The bottom portion 150 of the base shell 118 is cupped by the two side wings 162 which extend down from the back portion 152 and into the bottom portion 150 of the base shell. The short legs 132 of the frame 122 are located in the cupped bottom portion. As shown in FIG. 14, the bottom portion 150 of the base shell 118 also includes a central channel 154 through which a harness belt passes.

Foam Shell

Figure 6:
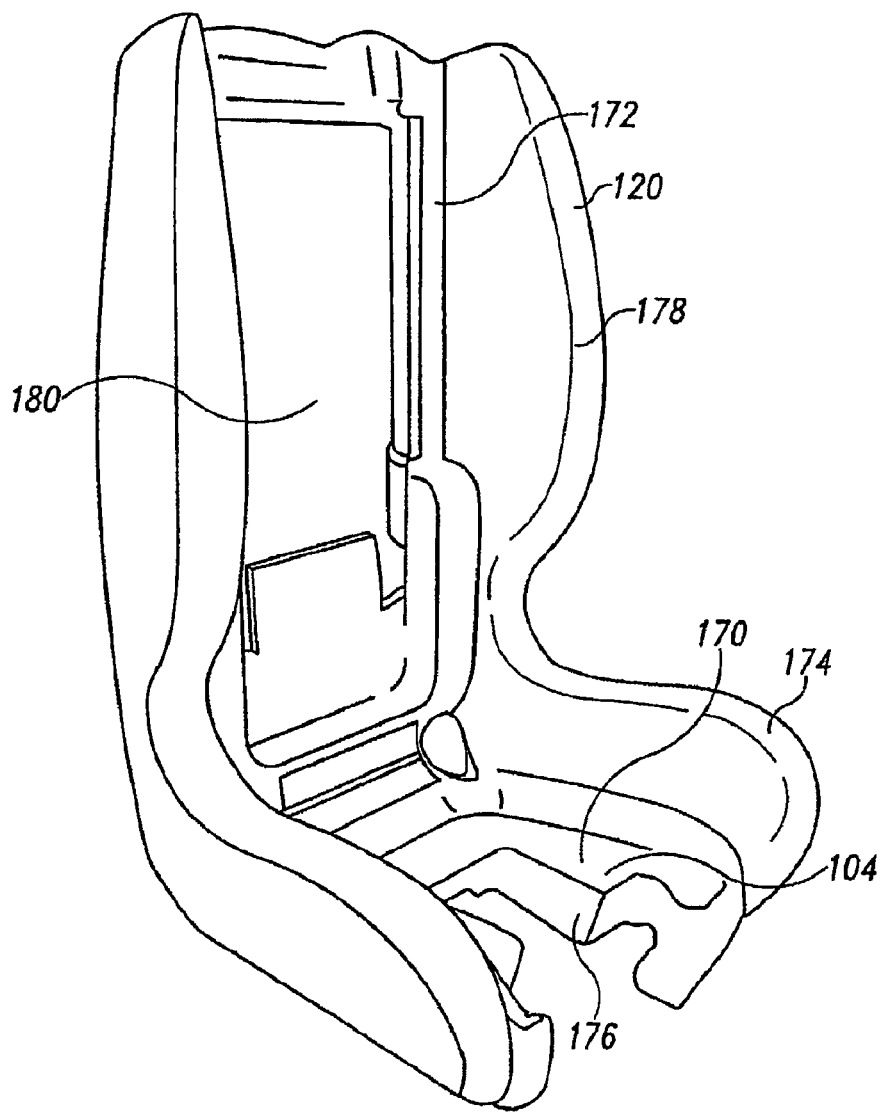
FIG. 6 shows a front perspective view of the foam shell of the child vehicle seat of FIG. 1.
Figure 7:
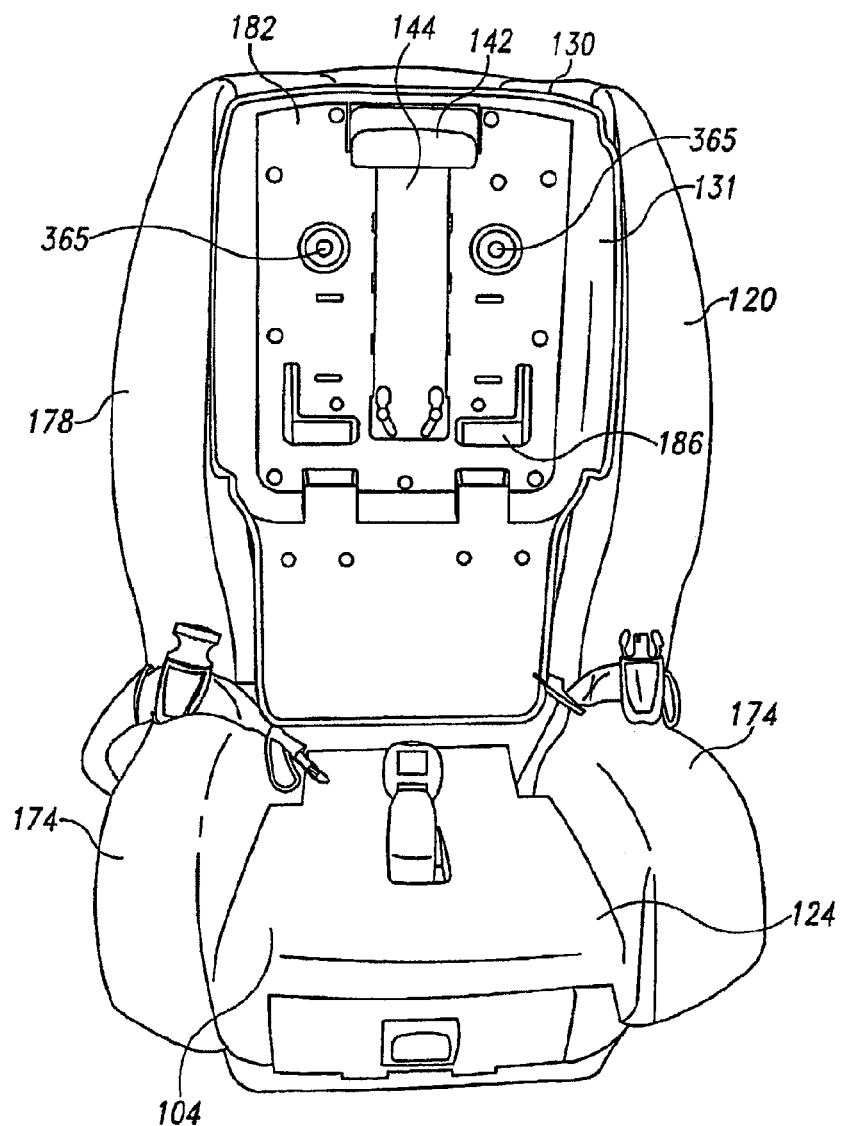
FIG. 7 shows a front perspective view of the child vehicle seat of FIG. 1 with a seat cover and headrest foam removed and the headrest in a down position.
Figure 8:
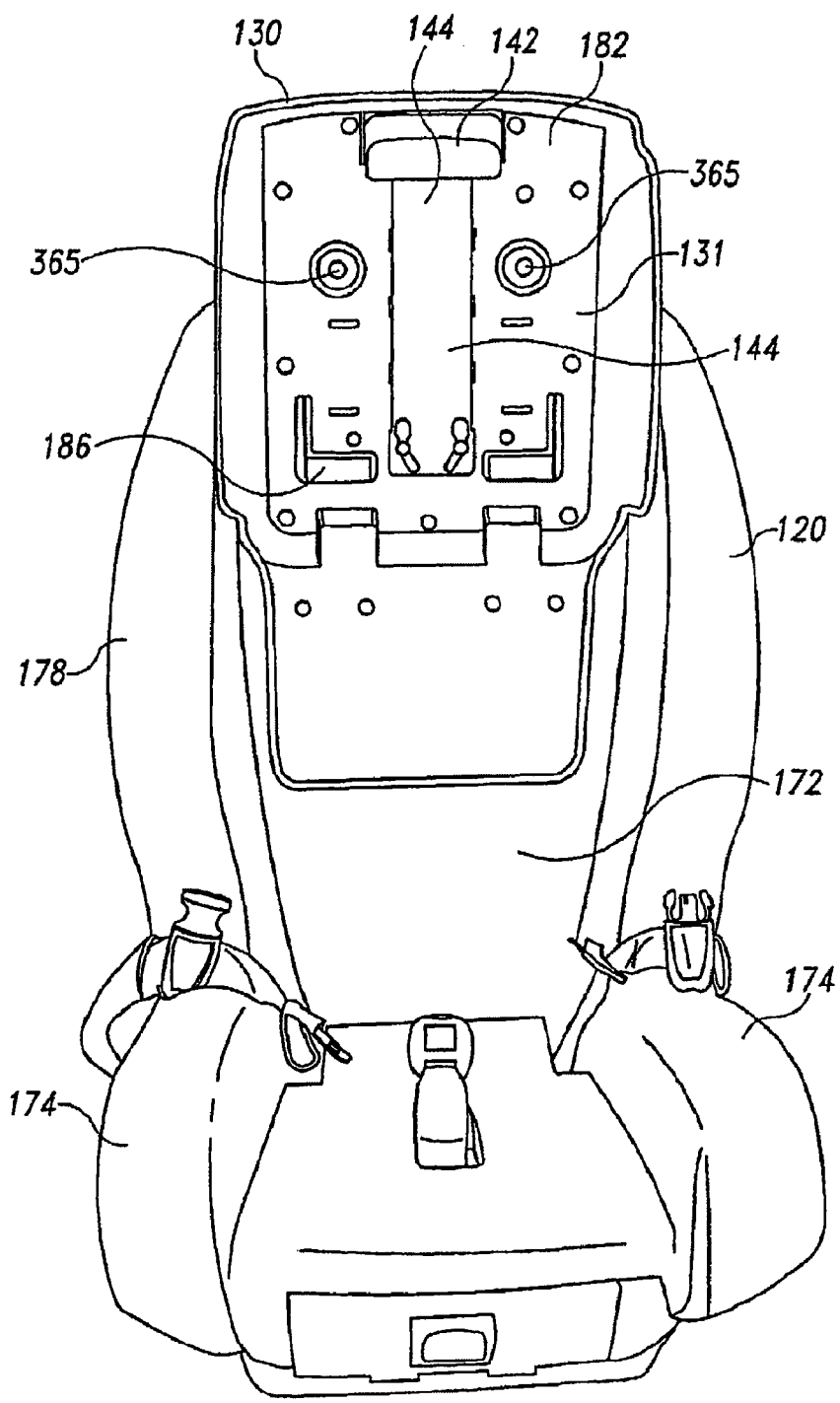
FIG. 8 shows a front perspective view of the child vehicle seat of FIG. 7 with the headrest in an up position.

With reference now to FIG. 6-8, the top foam shell 120 is generally a single integral component. The foam shell generally comprises a seat 170 and a backrest 172. Two arm rests 174 flank the seat 170, and a recess 176 is formed in the front of the seat, as shown in FIG. 6. The arm rests flow into two sidewalls 178 that flank the backrest 172. An opening is formed in the backrest for receiving the adjustable headrest support 130. The foam shell 120 is made of a dense foam material, such as ethylene propylene copolymer, with a density ranging between 20 g/l and 180 g/l. In one preferred embodiment, the dense foam material is ethylene propylene copolymer with a density of 30 g/l. Such foam material is sold by JPS International under the trademark ARPRO® expanded polypropylene beads. The foam shell is relatively flexible compared to the more rigid portions of the child seat 100, and is designed to cradle the occupant of the child seat in the event of side impacts. The foam shell is soft to the touch and is configured to absorb a significant amount of energy in the event of a crash. In addition, extreme temperatures have relatively little effect on the foam shell so that cracking of the foam shell does not occur in the event of a vehicular accident. The foam shell is designed and configured to cushion the occupant and protect the occupant in the event of an accident.

As described above, the foam shell is positioned over the anterior sides of the frame 122 and base shell 118. The frame 122 is thus generally enclosed by a two-part shell which includes the base shell 118 on one side and the foam shell 120 on the other side. The foam shell 120 is secured to the frame 122 and/or base shell 118 using any of various fastening methods known to those of ordinary skill in the art. For example, the foam shell 120 may be secured to the base and frame using hook and loop type fastener strips, such as those sold under the trademark VELCRO®, or nuts and bolts or other fasteners.

Figure 30B:
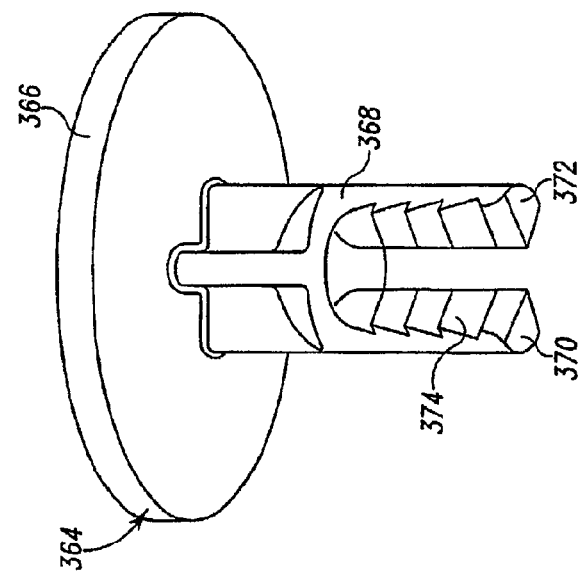
FIGS. 30A and 30B show perspective views of two separated locking pieces of a fastener for the child vehicle seat of FIG. 21.
Figure 30A:
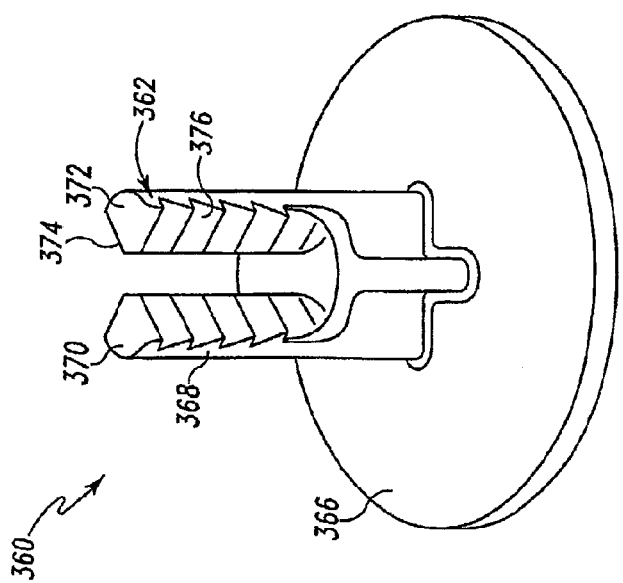
Figure 31:
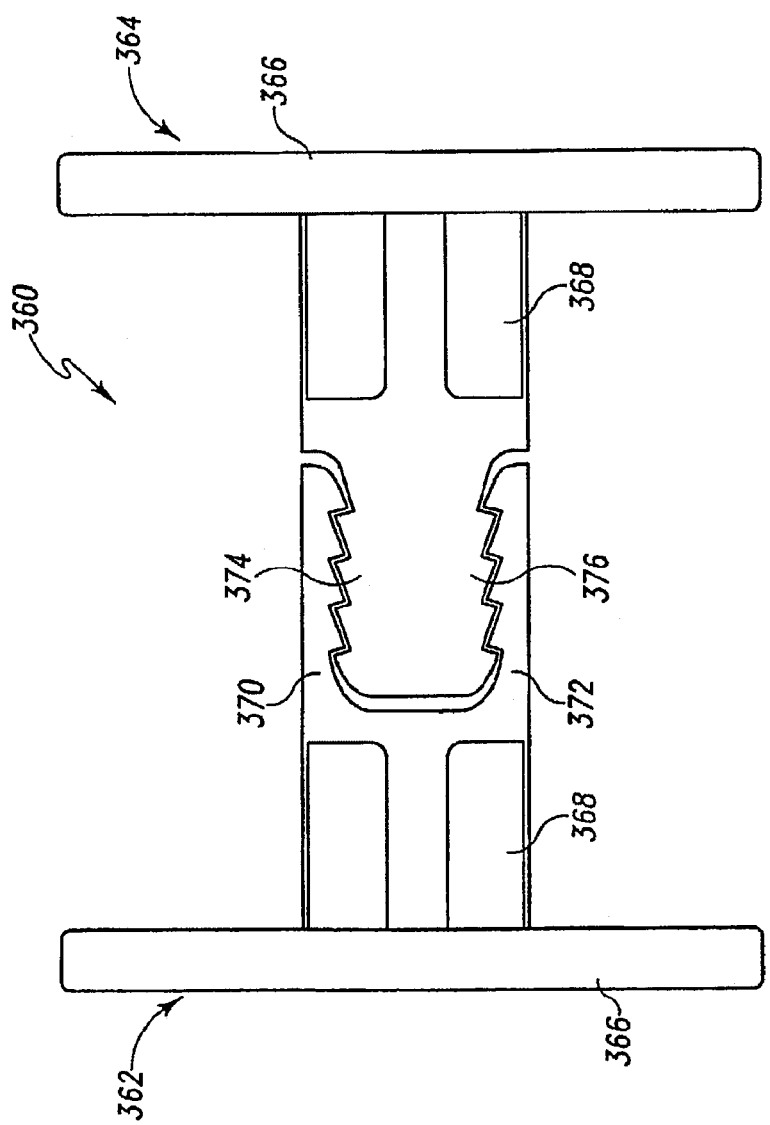
FIG. 31 shows a perspective view of the locking pieces of FIG. 30 in an engaged position.

An exemplary fastener 360 which may be used to secure the foam headrest 102 to the headrest support 130 is shown in FIGS. 30A, 30B, and 31. The fastener 360 includes two complementary molded locking pieces 362 and 364. Each locking piece includes a circular anchor 366 with an extending post 368. The extending post includes two opposing tines 370 and 372. Each tine 370, 372 includes a first plurality of teeth 374 axially positioned along one interior side and a second plurality of teeth 376 axially positioned along another interior side such that the first plurality of teeth 374 are 90° offset from the second plurality of teeth 376. When the posts 368 are mated, the tines 370, 372 from one locking piece 362 slide along the tines 370, 372 of the opposite locking piece 364, and the teeth 374, 376 on the tines act in a ratcheting fashion, such that the posts 368 can only become further engaged, and are locked from disengagement. When the posts 368 are fully engaged, the locking pieces 362, 364 are fastened and cannot be pulled apart without destruction of the locking pieces. When used on the seat 100, the circular anchor 366 from one locking piece 362 is embedded in the foam shell with its post 368 extending through a hole 363 defined in the foam headrest 102 (see, e.g., FIG. 1). The post 368 of the other locking piece 364 extends through a hole 365 defined in the headrest support 130 (see, e.g., FIGS. 7 and 8). When the two posts 368 are engaged, the ratcheting action on the teeth locks the posts together, thereby securing the foam headrest 102 to the headrest support 130.

Headrest Support

Figure 9:
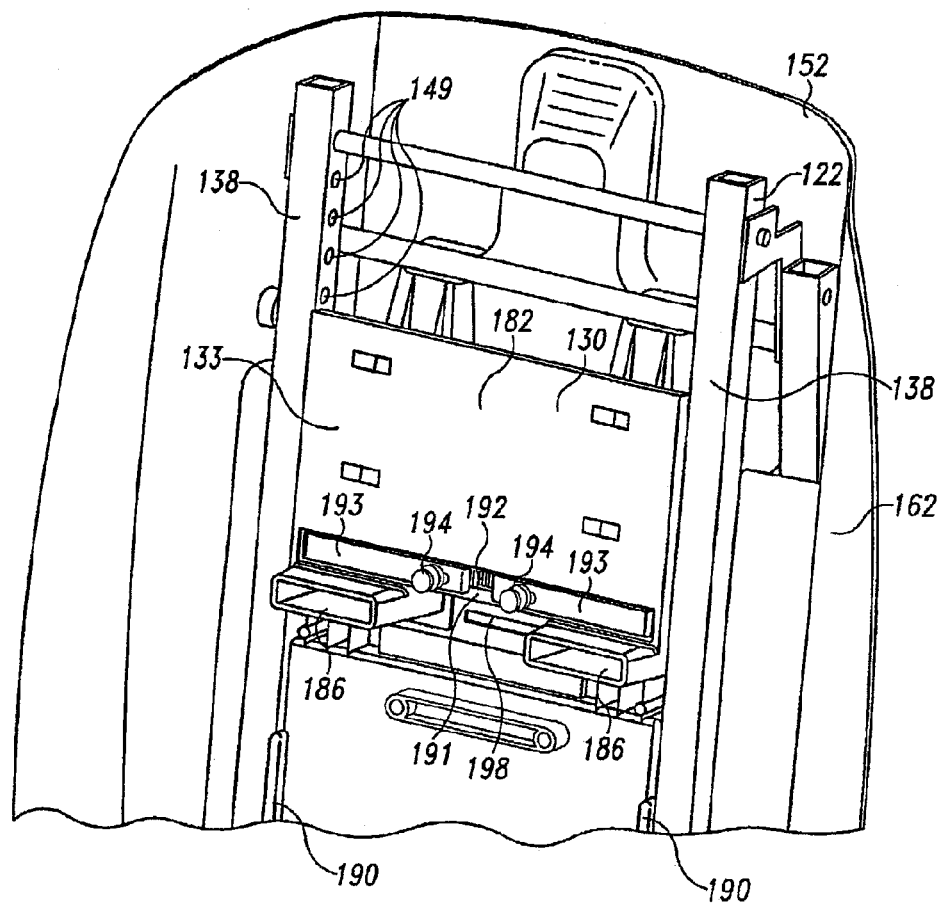
FIG. 9 shows a front perspective view of the headrest support of the child vehicle seat of FIG. 1 with the headrest removed from the headrest support.

With reference to FIGS. 1 and 7-9, the headrest support 130 is generally rectangular in shape and is adjustably mounted on the parallel support bars 138 of the frame 122. The headrest support 130 includes a front face 182 and a rear face 184. As best seen in FIG. 9, u-shaped channels 190 are positioned along the edges of the headrest support. The u-shaped channels 190 are designed to curve around and receive the support bars 138, thus guiding the headrest support 130 as it slides up and down along the support bars 138. The headrest support 130 includes a forward portion 131 (see, e.g., FIGS. 7 and 8) and a rear portion 133 (see, e.g., FIG. 9). The forward portion 131 and the rear portion are secured together, and thus, move in unison during adjustment of the headrest support 130.

As discussed above, the headrest is mounted directly on the headrest support 130. For example, fasteners 360, such as those shown in FIGS. 30A, 30B, and 31 may be used to secure the headrest 102 to the headrest support 130. In an alternative embodiment, a resilient foam material is interposed between the forward portion 131 of the headrest 130 and the rear portion 133 of the headrest 130. The resilient foam material provides cushioned support for the headrest.

The front face 182 of the headrest support 130 also includes two belt guides 186. The two belt guides 186 extend from the front face 182 and provide for passage of the harness straps 200 through the headrest support. The headrest 102 includes holes designed to allow the belt guides 186 to extend through the foam cushion of the headrest. As explained in further detail below, the belt guides 186 also properly position the harness straps at various vertical heights as the headrest support 130 and headrest 102 are moved to account for children of different sizes in the child seat 100. A slit 198 is also defined in the headrest support 130 to provide an additional passage from the front face 182 to the rear face 184. As explained in further detail below, the slit 198 is designed to receive the end of one of the harness belts, and secure it to the headrest support 130, thereby assisting in automatically adjusting the harness as the headrest support 130 and headrest 102 are moved.

Figure 16:
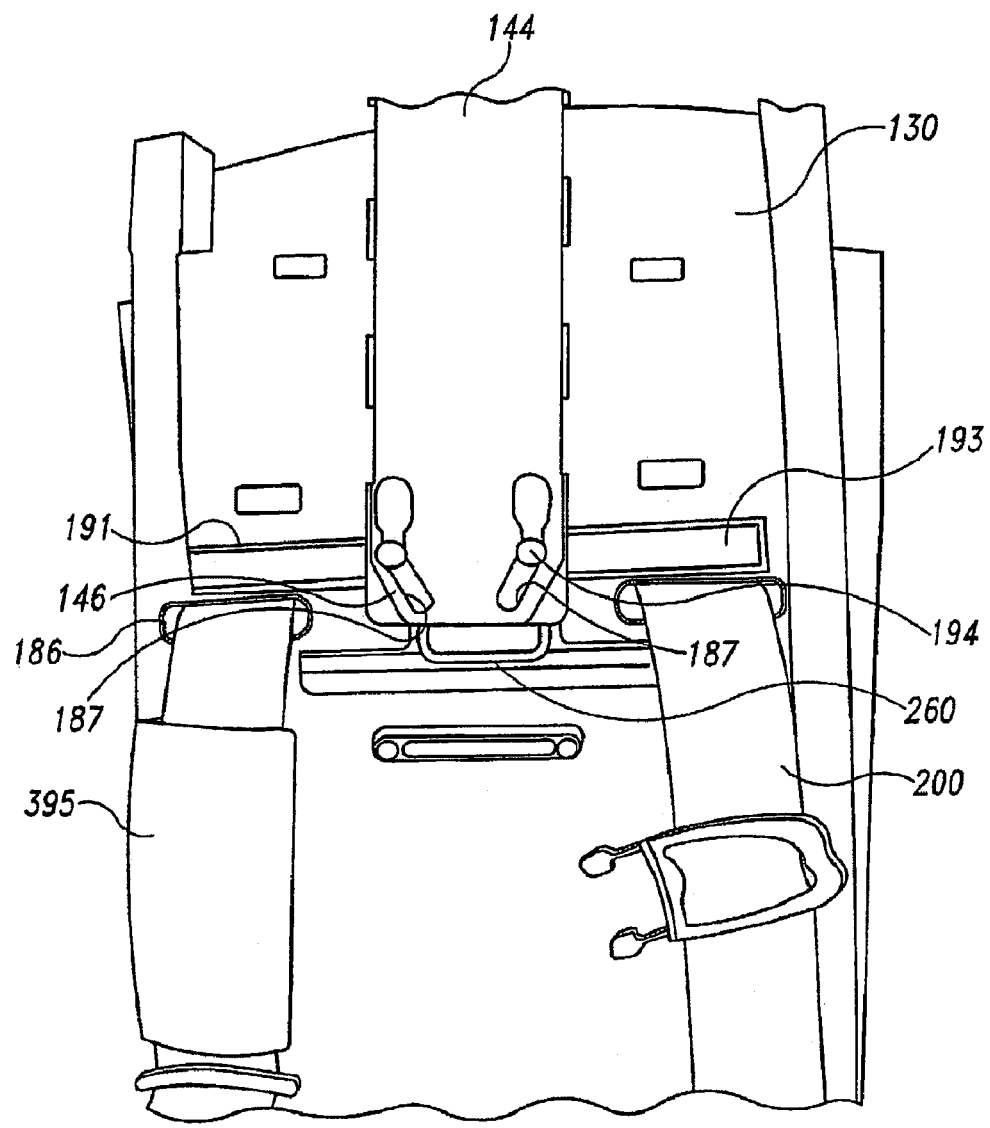
FIG. 16 shows a front view of the headrest support of the child vehicle seat of FIG. 1, and showing the adjustment bar.
Figure 16A:
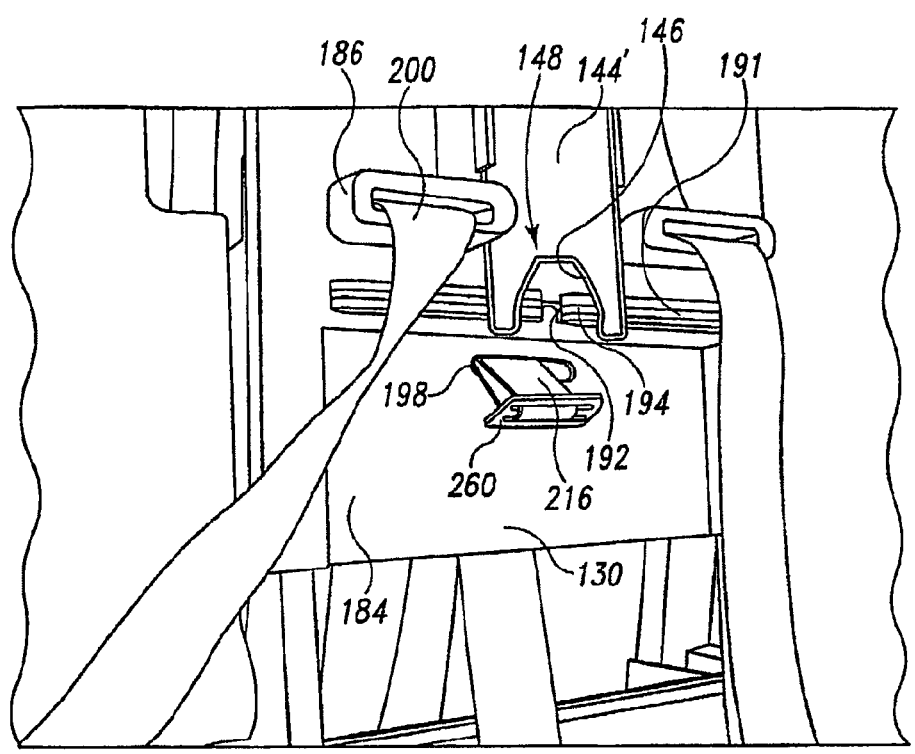
FIG. 16A shows a front view of an alternative embodiment of a headrest support of the child vehicle seat, and showing an alternative embodiment of the adjustment bar in relation to that shown in FIG. 16.

Also included on the front face 182 of the headrest support 130, behind the headrest 102, is a panel adjustment mechanism 148. With reference to FIGS. 9 and 16, the panel adjustment mechanism includes a horizontal center track 191 defined in the headrest support 130. Two pins 193 are positioned in the horizontal center track 191. The two pins 193 are biased toward the outer edges of the track 191 by a center spring 192. Each pin 193 includes a locking post (not shown) designed to extend out of an end the track 191 and into one of a plurality of holes 149 in the support bar 138 of the frame. However, each of the two pins 193 are slideable within the track 191 such that the locking posts may be removed from the holes 149 in the support bar if the pins 193 are moved a sufficient distance toward the center of the track 191 against the bias of center spring 192. A knob 194 is provided on each pin 193 to facilitate movement of the pin within the track 191. As best seen in FIG. 16, each knob 194 extends out of the track and contacts an angled cam surface 146 on the end of an adjustment bar 144 that is slideably mounted to the front face 182 of the headrest support 130. The angled cam surface 146 is defined by two angled slots 187 (see, e.g., FIG. 16A) such that opposing sides of the surface are further apart near the bottom than at the top. The opposite end of the adjustment bar 144 includes a handle 142 (see FIGS. 7-8). The handle 142 is spring biased in a downward position.

According to the above arrangement, when a user pulls up the handle 142, the adjustment bar 144 slides upward and the angled surface 146 of an angled slot also moves upward. As the angled cam surface 146 slides upward, the knobs 194 on the pins 193 ride along the angled cam surface, forcing the pins 193 closer together, toward the center of the track. When the pins 193 are moved to the center of the track, the locking posts on the pins are removed from the holes 149 in the support bar 138. Accordingly, the headrest support 130 and connected headrest 102 are free to slide along the support bar 138. When the proper position for the headrest 102 is found, the user releases the handle 142 and the handle returns to a downward position. As the handle 142 returns to the downward position, the adjustment bar 144 and angled cam surface 146 also move downward, allowing the knobs 194 on the pins 193 in the track 191 to move further apart. The spring 192 then forces the pins apart, thereby forcing the locking posts into the holes 149 in the support bar 138 when the locking posts are properly aligned with the holes 149. FIG. 16 shows an alternative embodiment of an adjustment bar 144' possessing an alternative camming arrangement configured generally to possess an inverted U-shape or inverted V-shape. With such an alternative arrangement, the operator would push down on the handle 142 in order to remove the pins 193 from the corresponding holes 149 defined in the support bar 138 so that the headrest support 130 could be adjusted.

Headrest

Figure 10:
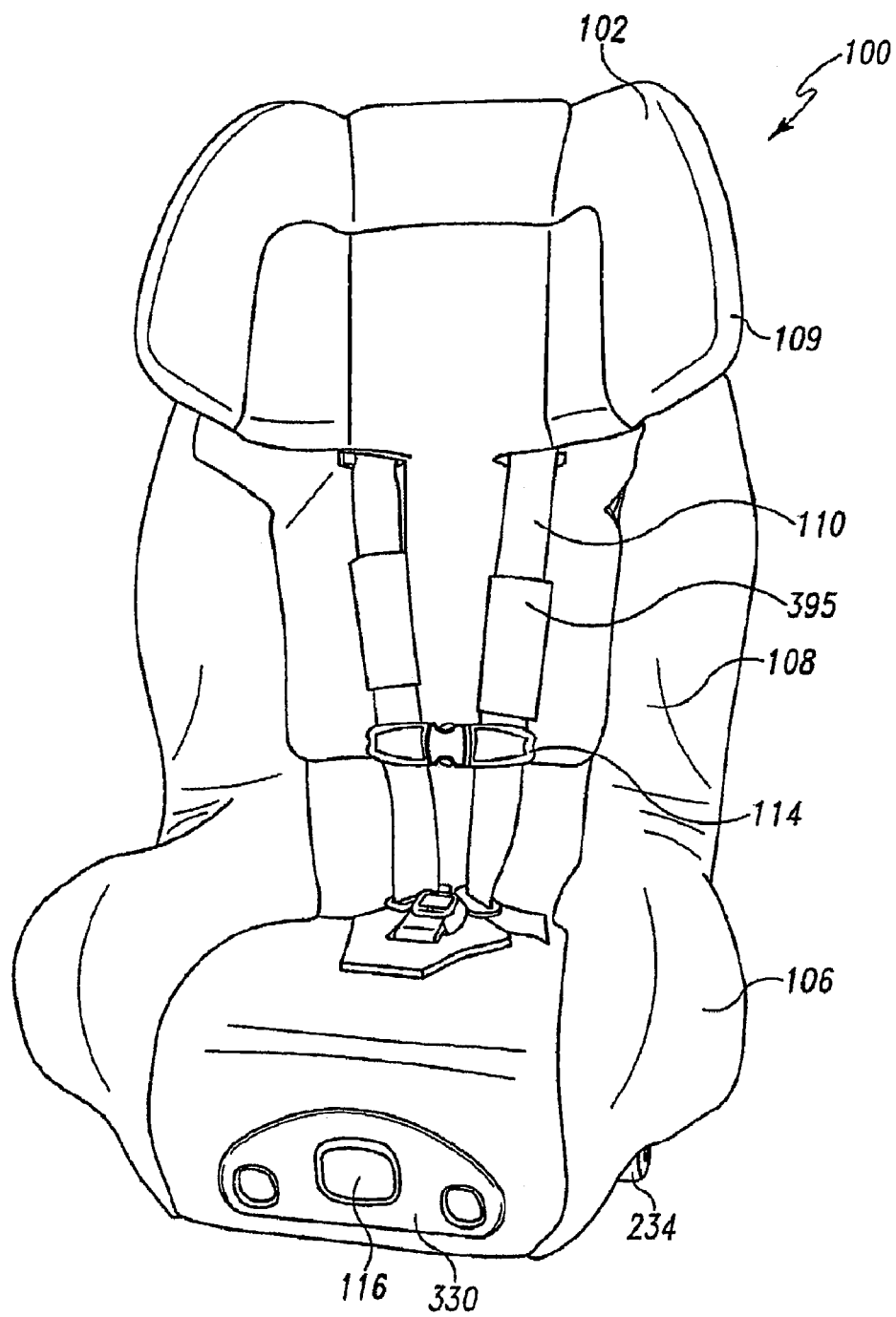
FIG. 10 shows a fully assembled front perspective view of the child vehicle seat of FIG. 1.
Figure 11:
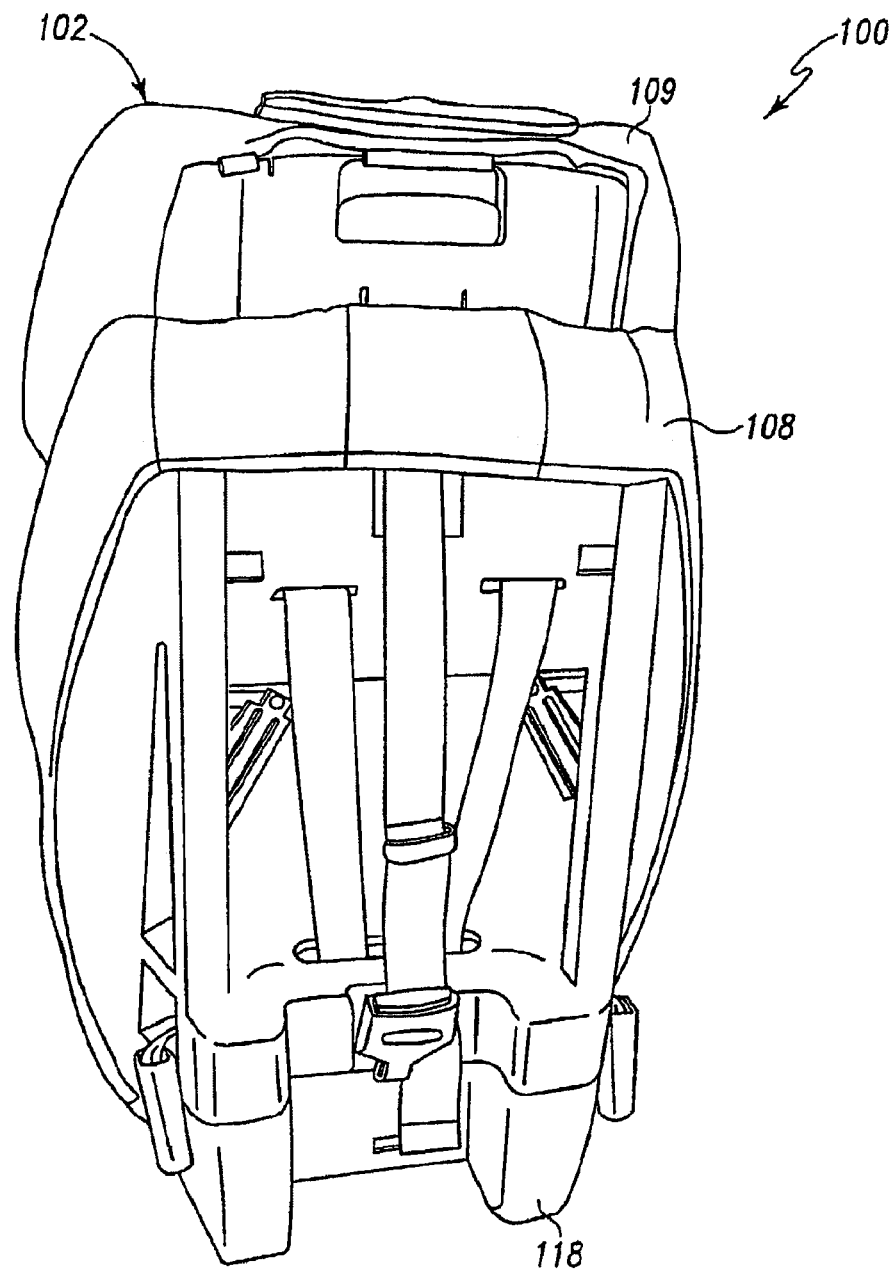
FIG. 11 shows a rear perspective view of the child vehicle seat of FIG. 10.

With reference to FIGS. 1, 10 and 11, the headrest 102 is mounted on the top portion of the headrest support 130. The headrest 102 is comprised of the same material as the foam shell 120. In particular, the headrest is comprised of a dense foam material, such as ethylene propylene copolymer. Such foam material is commercially available through JPS International under the trademark ARPRO® expanded polypropylene beads.

The headrest 102 includes a central portion 101 that is secured to the headrest support 130. The central portion 101 includes two shoulder harness slots 105 that are aligned with the harness guides 186, allowing straps to pass through the headrest support 130 and headrest 102. The central portion 101 of the headrest 102 is integral with two flexible sidewalls 103 having generally curved perimeters. Each sidewall 103 extends about 6 to 12 inches outward and away from the location where the central portion 101 is attached to the headrest support 130. Each sidewall 103 also curves around the base shell 118 as it extends away from the central portion 101. While the central portion 101 is securely fastened to the headrest support 130, the sidewalls 103 are free to bend in relation to the central portion 101. In particular, the sidewalls 103 of the headrest 102 are free to pivot near the point where the headrest 102 is fastened to the headrest support 130 and toward an occupant's head sitting in the child seat 100 in the event of an accident. This provides a significant amount of protection for the occupant of the seat 100 in the event of a side impact to the vehicle or a rollover. The dense foam material that forms the headrest 102 not only cradles the occupant's head in the event of an accident, but also serves as a cushion for sleeping.

Any number of different types of fasteners may be used to secure the headrest to the headrest support. For example, the fasteners 360 described above with two locking pieces 362, 364 may be used to secure the foam of the headrest 102 to the headrest support 130. Alternatively, loop and hook fastener material, such as VELCRO®, may be positioned on the back side of the headrest 102 and used to secure the headrest 102 to the headrest support 130. Low-density foam cushioning 124 may be attached to the headrest and headrest support to provide comfort padding for the back and head of the occupant of the child seat.

Seat Cover

As shown in FIGS. 10 and 11, a seat cover 108 covers the seat portion 104, and a headrest cover 109 covers the headrest 102. Foam cushioning 124 is placed on the foam shell, under the seat cover 108, to make the seat 100 more comfortable for the occupant. The seat cover 108 and headrest cover 109 provide a comfortable feel to the seating surface of the child seat 100 and also provide an aesthetically pleasing and desirable look to the child seat. The seat cover and headrest cover may be constructed from any material that is conventionally used with seats in the automotive vehicle industry, such as leather, vinyl, cloth, or the like, or any materials used as cover materials in the juvenile furniture industry, such as polyester, terry cloth, or the like.

Figure 21:
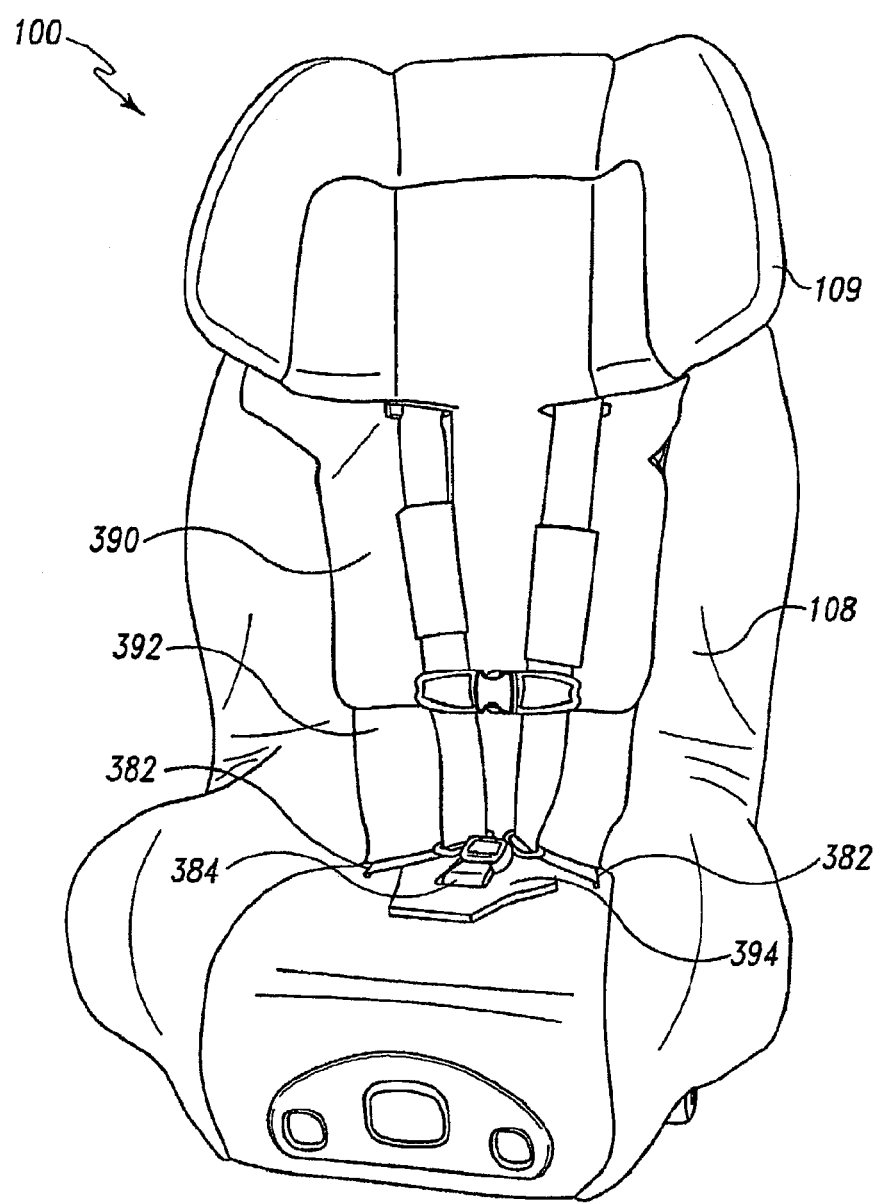
FIG. 21 shows a top front perspective view of an alternative embodiment of the child vehicle seat of FIG. 1 with a removable seat cover.
Figure 22:
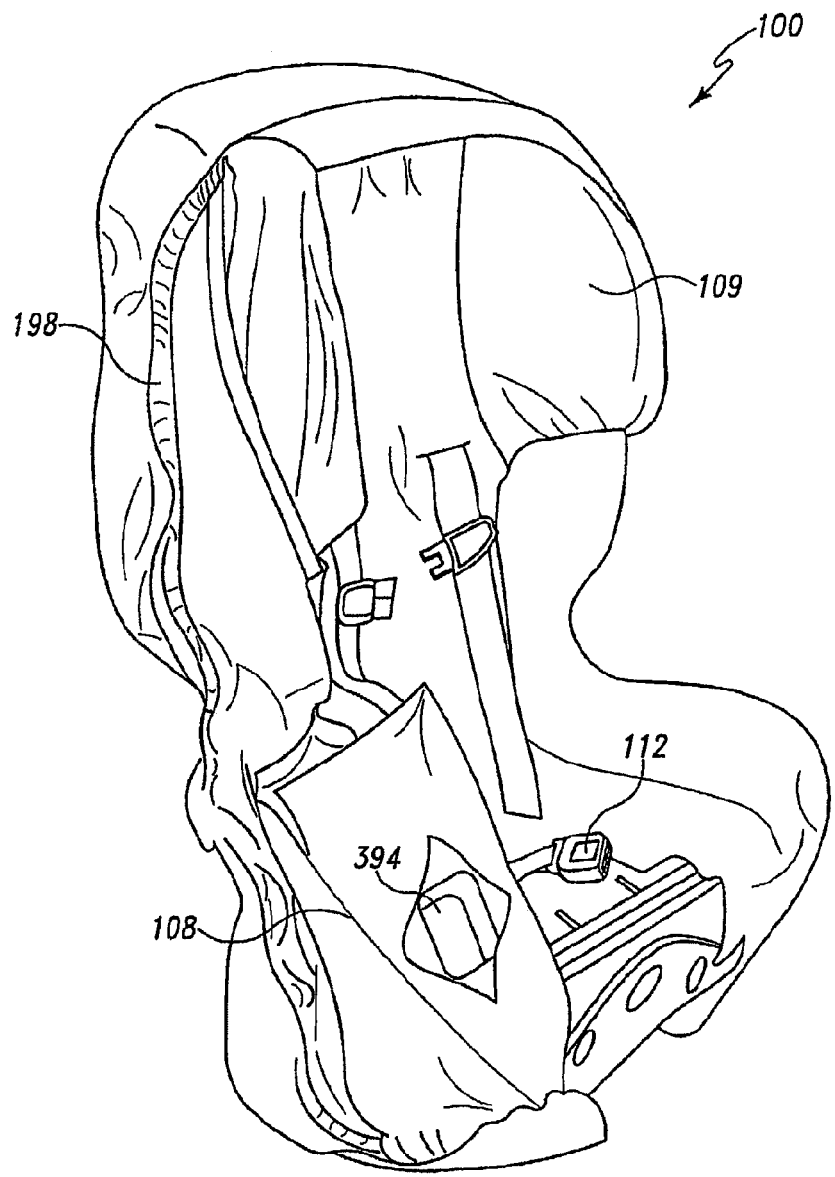
FIG. 22 shows another top front perspective view of the child vehicle seat of FIG. 21 with the seat cover partially removed.

In one embodiment, the seat cover 108 is designed for removal from the foam shell 120 and base shell 118 without the need to remove any straps from the harness of the child seat 100. This embodiment is generally shown with reference to FIGS. 21 and 22. In this embodiment, the seat cover 108 and headrest cover 109 include a plurality of slits 380-384 and a plurality of flaps 390-394. The slits and flaps allow the seat cover 108 and headrest cover 109 to be manipulated around the harness straps. For example, slit 384 allows the buckle 112 of the buckle harness system 211 (described below) to pass through the slit 384, and flap 394 may be opened to re-insert the buckle through the slit when reattaching the cover to the seat. The backrest flaps 390 and 392 and slits 380 and 382 are other slits that may be manipulated when removing or attaching the cover. Seat cover fasteners, for example hook and loop type fasteners such as VELCRO®, are used to connect the slits and flaps and secure them in place on the seat while also providing a smoother more uniform appearance to the seat. The periphery of the seat cover 108 is designed to overlap the edges of the base shell 118. The periphery 198 of the seat cover 108 is lined with an elastic material that helps retain the seat cover 108 on the base shell 118.

Harness System

The harness system 110 is generally shown with reference to FIGS. 12-16. The harness system 110 includes a web 200 comprised of a plurality of belts/straps as well as several buckles. As shown in FIG. 12, the harness system 110 may be considered a two-part system, including a shoulder harness system 201 and a buckle harness system 211. The configuration of the plurality of harness belts in relation to the frame are described for both the shoulder harness system and the buckle harness system with reference to FIG. 12. Thereafter, features of the harness system are described in relation to other portions of the child seat 100.

Shoulder Harness System

With reference to FIG. 12. The shoulder harness system 201 includes a shoulder belt 202 that includes a first end 204 fastened to one port of a Y-connector 250 and a second end 206 fastened to another end of a Y-connector 250. Starting with the first end 204, the shoulder belt moves up from the Y-connector 250, over the cross member 129, and down under the frame 122. After passing under the two short legs 132 of the L-shaped members 126, the shoulder belt 202 is passed back up to the cross member 129 on the other side of the frame 122. The shoulder belt 202 then loops over the cross member 129 on the opposite side of the cross member from where it originally looped over, and follows back down to the Y-connector 250, where the shoulder belt 202 terminates and is again fastened to the Y-connector (also see FIG. 4). The other belt fastened to the Y-connector 250 is a retraction belt 208. The retraction belt moves down along the angled panel 156 of the base shell and, after making turn, passes into the central channel of the base shell. A dotted line 118 is provided in FIG. 12 to represent this portion of the base shell 118 in relation to the frame 122. After passing through the central channel of the base shell, the retraction belt 208 feeds into the retractor (represented by dotted line 300). In particular, the end of the retraction belt is fastened to the feed bar 302 of the retractor. The feed bar may be turned in the direction of arrow 232 using knob 234 (also see FIG. 1) to wind the retraction belt 208 in the retractor 300, thereby tightening the shoulder belt 202 and helping to secure an occupant in the child seat 100. Conversely, the knob 234 and feed bar 302 may be turned in the direction opposite arrow 232 to pay out additional portions of the retraction belt 208 from the retractor, thereby providing additional slack for the shoulder belt when a larger occupant is seated in the child seat 100.

Figure 13:
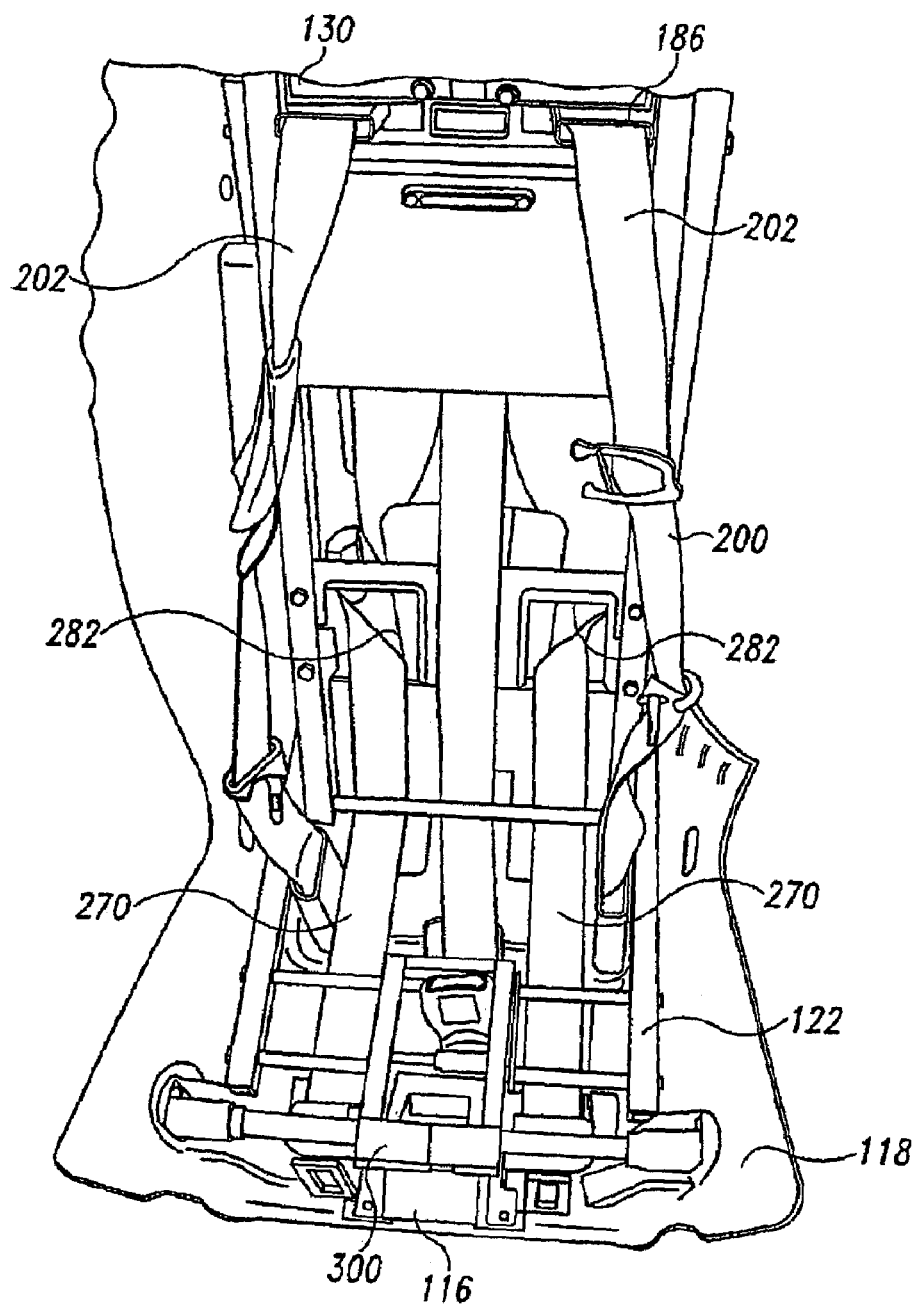
FIG. 13 shows a front perspective view of the harness of the child vehicle seat of FIG. 12 with the harness unbuckled.

Referring now to FIGS. 13-16, the shoulder harness system is shown with respect to the frame 122, base shell 118, and headrest support 130. As shown in FIG. 13, the shoulder belt 202 passes through both belt guides 186 on the headrest support 130 as the shoulder belt 202 winds over cross bar 129 and under the bottom portion of the base shell 118. Although the shoulder belt 202 passes through the belt guides 186 on the headrest support 130, the shoulder belt only slideably engages the belt guides and does not connect to the belt guides. This allows the headrest support 130 and attached headrest 102 to move up and down upon the frame 122 and move to various positions, as discussed above, without the need for removal, loosening or other adjustment of the harness 110, including the shoulder belt 202. Accordingly, the headrest 102 and associated mechanism is independent of the harness 110. Furthermore, this arrangement of the harness shoulder belt 202 passing through the belt guides 186 means that the headrest is not a load-bearing component of the child seat 100. The arrangement of the shoulder belt 202 upon the frame 122 means that most of the load is applied to the frame in the event of a crash. The headrest may be adjusted to any position without loosening the harness.

Buckle Harness System

Referring again to FIG. 12, the harness belts 200 of the child seat further comprise belts in a buckle harness system 211. The buckle harness system 211 includes a crotch adjustment belt 214 and a crotch belt 220. A first end 216 of the crotch adjustment belt 214 is inserted through the slit 198 in the headrest support 130 (represented by dotted lines 130 in FIG. 12) and is fastened to a buckle 260. The buckle 260 secures the first end 216 to the headrest support 130, since the buckle is prevented from passing through the slit 198 to the headrest support 130 (as shown in FIG. 16). The crotch adjustment belt 214 extends up from the buckle 260 and over the center portion of the cross bar 129. Then, the crotch adjustment belt 208 passes down to the cross bar 128c and turns toward cross bar 128b. After passing under cross bar 128b, the crotch adjustment belt 208 is fastened to crotch adjustment bar 128a. An adjustable connector 240 is looped around the crotch adjustment belt 208 between the cross bars 128a and 128b such that the adjustable connector 240 is free to slide upon the crotch adjustment belt 214. One end of a crotch belt 220 is securely fastened to the adjustable connector 240. The opposite end of the crotch belt 220 is connected to the buckle 112. As the headrest support 130 and associated first end 216 of the crotch adjustment belt 214 move up, slack is provided in the crotch adjustment belt 214. This slack allows the buckle 112 connected to the crotch belt 220 to extend further away from cross bars 128a and 128b. Conversely, when the headrest support 130 and associated first end 216 of the crotch adjustment belt 214 move down, the crotch adjustment belt 214 is tightened and less of the belt is available between cross bars 128a and 128b. With less belt available between these cross bars, the fastener 240 and buckle 112 are pulled downward toward the cross bars 128a and 128b.

Figure 14A:
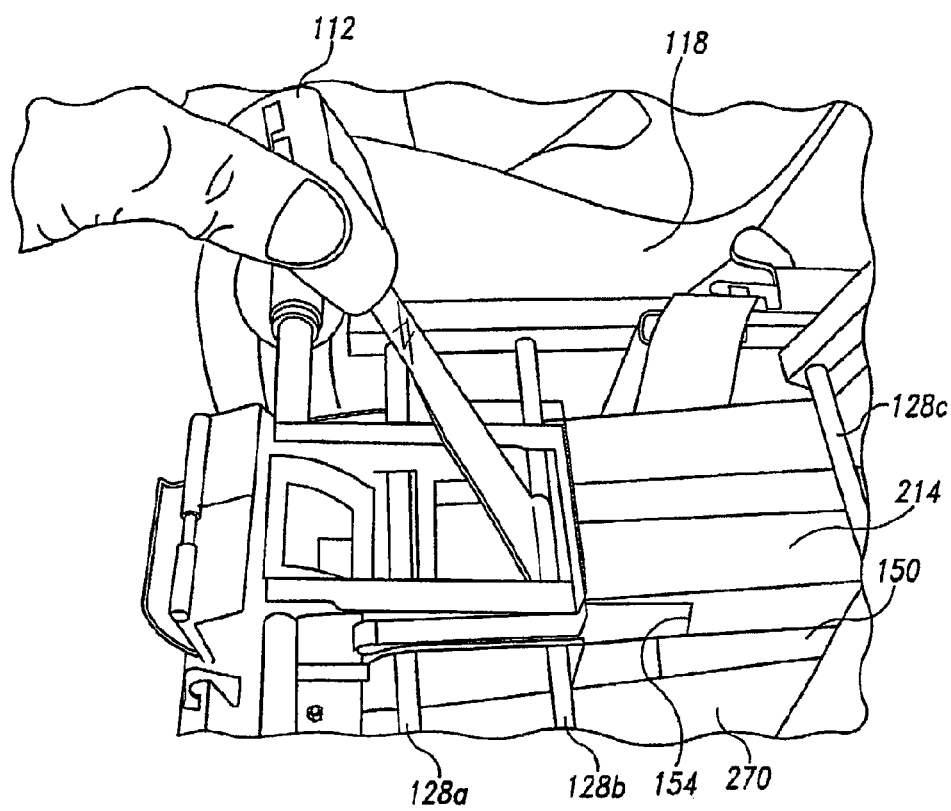
FIG. 14A shows a top perspective view of an alternative embodiment to the arrangement shown in FIG. 14 in which a tether belt is utilized to limit upward movement of the front buckle, and showing the crotch strap in an extended position.
Figure 15:
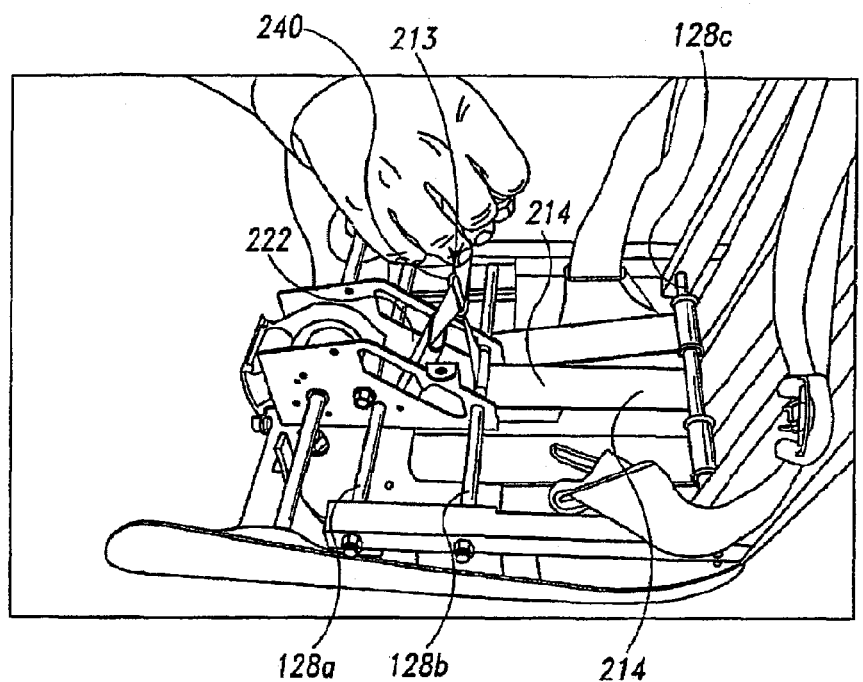
FIG. 15 shows a top perspective view of the child vehicle seat of FIG. 13 with a crotch strap in a retracted position.
Figure 15A:
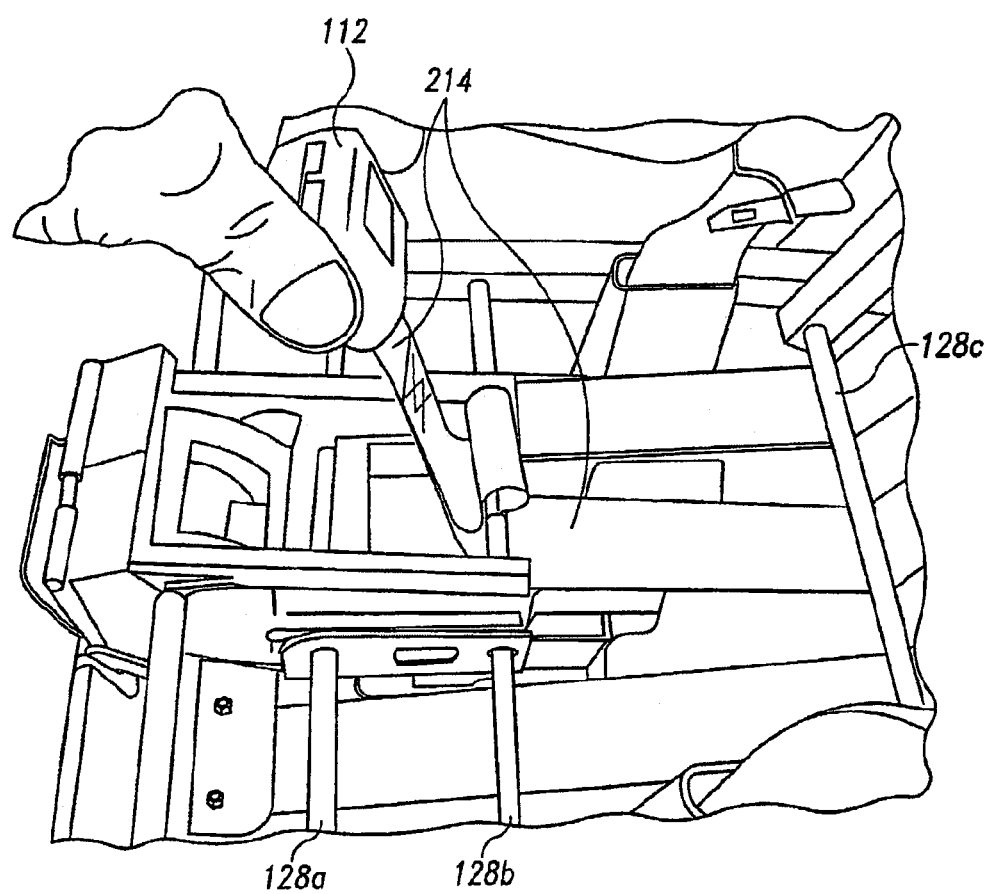
FIG. 15A shows a top perspective view of the alternative embodiment of FIG. 14A in which the crotch strap is shown in a retracted position.

Referring now to FIGS. 14-15, the crotch adjustment belt 214 is shown in two different positions. In FIG. 14, the crotch belt 214 is in an extended position. In this extended position, the headrest support 130 and headrest 102 are moved fully up, providing slack in the crotch adjustment belt 214 that allows the adjustable connector 240 and attached crotch belt 220 to move to the extended position. In FIG. 15, the crotch adjustment belt is in a retracted position. In this retracted position, the headrest support 130 and headrest 102 are moved fully down, taking up slack in the crotch adjustment belt 214 to move the crotch belt 220 to its retracted position. In this retracted position, a spacer 222 is shown encouraging the adjustable connector 240 more rearward. The spacer 222 is a plastic material that prevents the adjustable connector from contacting the portion of the belt 214 covered by the spacer 222. Therefore, when little slack is available in the belt 214, the adjustable connector and associated crotch belt are encouraged toward the back of the seat. Accordingly, as the headrest 102 is moved up for taller (and larger) occupants, the buckle harness available to the occupant lengthens and moves toward the front of the child seat. As the headrest is moved down, the buckle harness available to the occupant reduces in length and moves toward the rear of the seat. Accordingly, a child seat is provided that includes a buckle harness system 211 that automatically adjusts to the size of the occupant, based on the location of the headrest 102. In an alternative embodiment shown in FIGS. 14A and 15A, the front buckle 112 is not slidable along the crotch adjustment belt 214 as is the case in the embodiment shown in FIGS. 14 and 15. Rather, the front buckle 112 is attached to one end of the belt 214 as shown in FIGS. 14A and 15A. A tether belt 221 is added to limit upward movement of the front buckle 112. To this end, one end of the tether belt 221 is secured to the cross bar 128b while the other end of the tether belt 221 is secured to the one end of the belt 214 as shown in FIGS. 14A and 15A.

Altogether, the disclosed harness system 110, including the shoulder harness system 201 and buckle harness system 211 provide means of adjusting the shoulder and crotch strap heights to better fit with ideal belt positioning for children of various ages. Together, the shoulder harness system 201 and the buckle harness system 211 provide an integrated child restraint system that can be adjusted to ideally restrain children of various weights and sizes. In one embodiment, the integrated child restraint system is designed for restraining children from 22-65 lbs. The restraint system includes a means to adjust shoulder belt heights while simultaneously positioning the crotch belt height and fore and aft position.

Central Belt Retractor

With reference to FIGS. 1 and 17-20, a central belt retractor 300 is provided on the front portion of the base shell 118. As shown in FIG. 1, a decorative and protective covering 330 generally shields the central retractor 300 when the seat is assembled. Removal of the protective covering 330 exposes the retractor 300.

Figure 17:
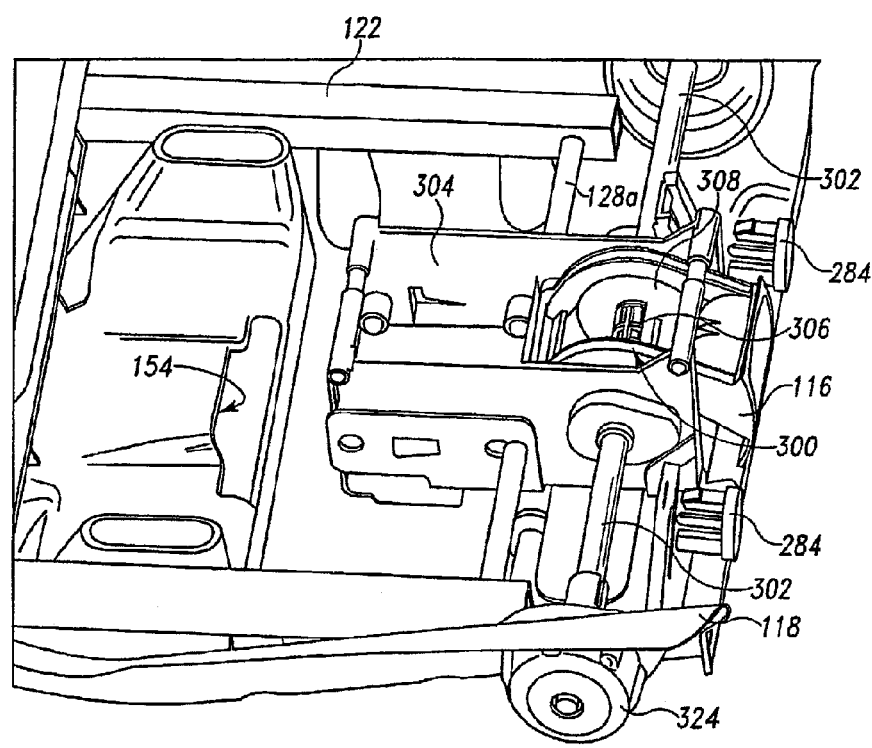
FIG. 17 shows a partial cutaway top perspective view of the child seat of FIG. 1 exposing the retractor and latch mechanism.
Figure 18:
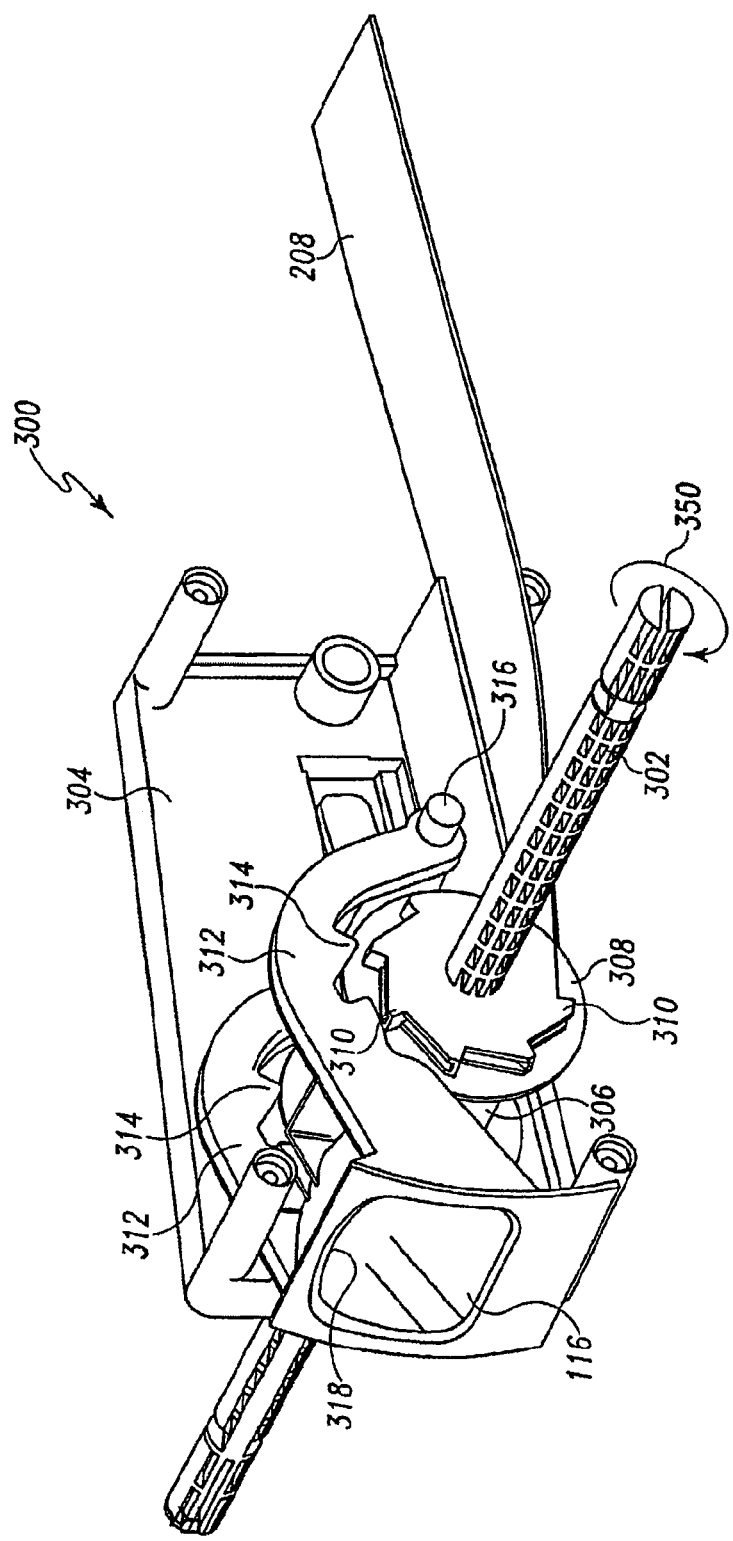
FIG. 18 shows a front perspective view of the retractor mechanism of FIG. 17.
Figure 20:
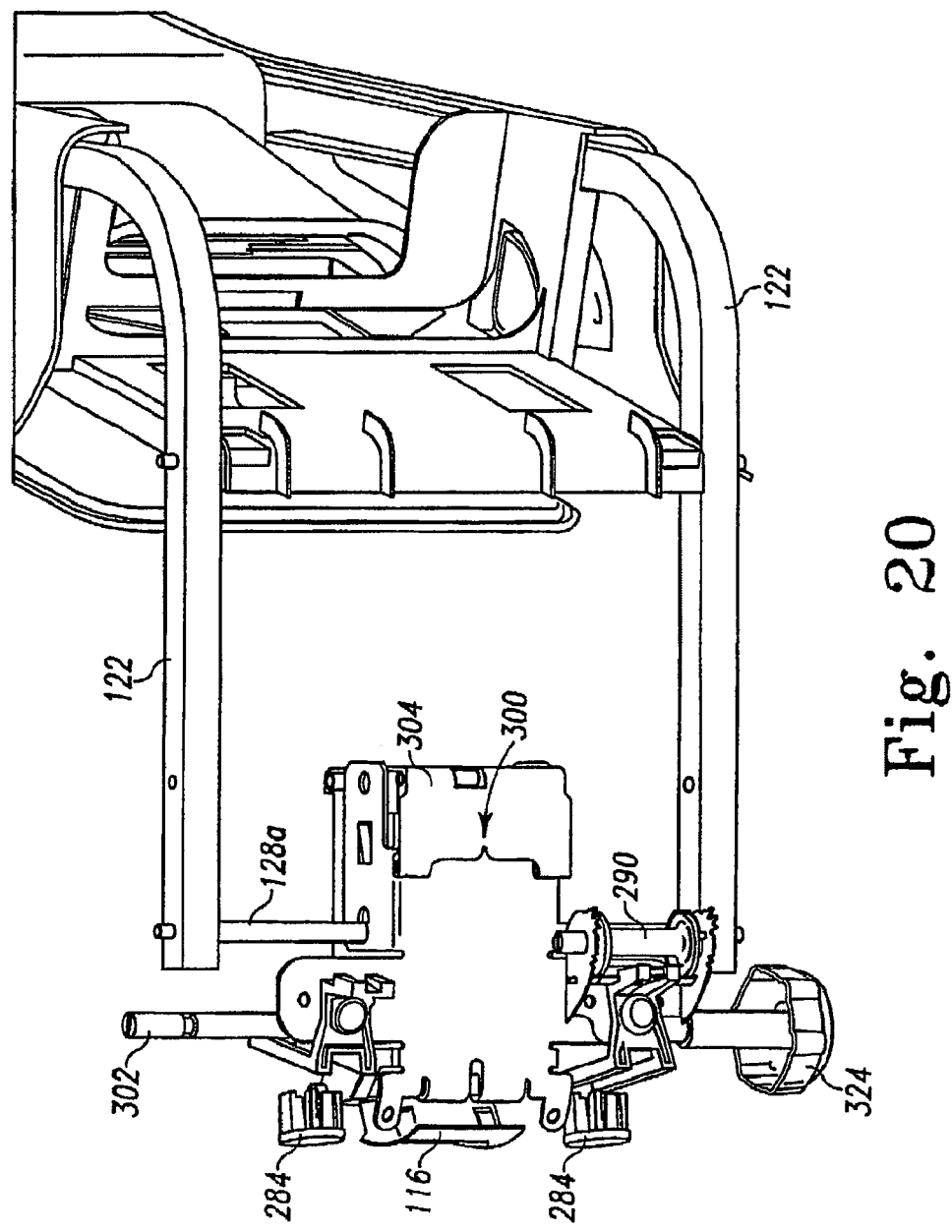
FIG. 20 shows a bottom perspective partial cutaway view of the child vehicle seat of FIG. 1.

As best shown in FIG. 18, the central retractor 300 includes a spool 306 and latch 116 that cooperate in a ratchet fashion to wind the retraction belt 208 on the spool. The spool 306 is retained within a retractor housing 304 that is secured to cross bar 128a. The spool 306 is mounted to an axle 302 that extends through the housing 304. As shown in FIGS. 19A-19C, a wound power spring 320 connects the spool 306 to the axle 302 and biases the spool toward clockwise movement, in the direction of arrow 350, which will wind the retraction belt 208 on the spool. The spool 306 includes two circular sidewalls 308 with ratchet teeth 310 formed on the circular sidewalls. As shown in FIGS. 17 and 20, a handle 324 is fixed to the end of the axle 302 to allow for manual rotation of the axle 302 and spool 306. In particular, manual rotation of the handle 324 by a user will cause the retraction belt 208 to be wound upon the spool. As described previously, because the retraction belt 208 is connected to the shoulder harness system 201, winding the retraction belt 208 upon the spool will tighten the retraction belt 208 and shoulder belt 202 and generally tighten the shoulder harness on an occupant of the seat.

Returning to FIG. 18, the latch 116 is provided for locking the spool 306 in place. The latch 116 includes a front handle 318 and two pawls 312 that extend rearwardly from the front handle 318. Each pawl 312 includes a plurality of pawl teeth 310 designed to engage the spool teeth 310 in a ratchet fashion. The latch 116 includes two pivot posts 316 that connect the latch to the retractor housing 304. The latch 116 also pivots within the housing 304 on the pivot posts 316. The front handle portion 318 of the latch 116 is biased downward by two springs 326. Because the latch 116 is biased downward, the pawl teeth 314 are encouraged toward engagement with the spool teeth 310.

Rotation of the spool 306 in the clockwise direction, as noted by arrow 350 in FIG. 18, results in the retraction belt 208 winding upon the spool 306. Because the spool 306 is spring biased, this rotation is generally automatic and acts to tighten the shoulder harness, as described above. Because of the ratchet action between the spool teeth 310 and the pawl teeth 314, the spool is normally blocked from counter-clockwise rotation, opposite the direction of arrow 350, which would allow the retraction belt 208 to be paid out. Furthermore, if the user wishes to take up additional slack in the retraction belt 208 and attached shoulder belt 202, the handle 324 connected to the axis 302 may be rotated in the direction of arrow 350, causing additional lengths of the retraction belt 208 to be wound upon the spool 306, and thereby tightening the shoulder belt 202 upon the occupant of the seat. Additional lengths of belt wound upon the spool 306 are retained by the spool because of the ratchet action of the spool teeth 310 with the pawl teeth 314. When the user desires to pay out previously wound lengths of the retraction belt 208 in order to loosen the connected shoulder belt 202, the latch handle 318 is moved upward. Upward movement of the latch handle 318 releases the pawl teeth 314 from the spool teeth 310. This separation allows the spool to rotate in a counter-clockwise direction, opposite the direction of arrow 350, and pay out additional lengths of the retraction belt 208 when the shoulder harness system 201 is pulled outwardly. However, because the spool 308 is spring biased, slack in the retraction belt 208 and shoulder harness system 201 is removed once the user stops pulling on the shoulder harness system. In this fashion, the shoulder harness system automatically tightens upon the occupant of the child seat and secures the occupant in the seat.

Connection to Vehicle Seat

Returning to FIGS. 1, 3-5, 13, 17, and 20 a system is provided for mounting the child seat 100 in a vehicle. In particular, vehicle connection straps 270 are provided that are connected to vehicle connection buckles 280. The connection straps are partially wound on retractable spools of retractors 290 (see FIG. 20) located under cross bar 128a. The retractors 290 for the vehicle connection straps 270 operate in a similar fashion to the retractor 300 for the retraction belt 208 and connected shoulder belts 202 (as described above with reference to FIGS. 17-20). For example, similar to retractor 300, the retractors 290 for the vehicle connection straps 270 are spring biased and automatically tighten the vehicle connection straps 270. The retractors 290 may be released by pressing the buttons 284 located next to the retraction latch 116 on the bottom front portion of the seat. Depression of one of the buttons 284 rotates a lever that releases a pawl from engagement with teeth on the retractor 290. When the pawl is otherwise engaged with the teeth, the pawl locks the retractor 290 from rotating in a direction that would pay out the vehicle connection strap 270. When the pawl is released from the teeth by depression of the button 284, the retractor 290 is allowed to rotate and pay out the vehicle connection strap 270. In one embodiment, the buttons 284 are connected by a connecting bar such that depression of either button 284 will release both of the retractors 290. It should be appreciated that the retractors 290 and the vehicle connection buckles 280 may, respectively, be constructed and operate in the same or similar manner to any of the retractors and vehicle connection buckles disclosed in Patent Publication No. US 2004/0084939, the disclosure of which is hereby totally incorporated by reference in its entirety.

The vehicle connection straps 270 extend horizontally from the spools of the retractor 290 along the bottom portion of the base shell 118. At one of the cross members 128 of the frame 122, the straps 270 make a perpendicular turn and extend vertically along the base shell. Thereafter, the connection straps pass through 45° slots 282 in the base shell 118. The 45° slots 282 redirect the straps 270 in a generally horizontal direction such that the straps 270 extend sideways relative to the upright child seat 100. The straps terminate in connection buckles 280 operable to connect to anchors in the vehicle seat.

In addition to the above method for connecting the vehicle seat to an automobile, the vehicle seat may also be secured to an automobile by passing the shoulder belt of the automobile through the triangular shaped openings 168 in the posterior portion of the base shell 118 and frame 122. After passing the shoulder belt through the openings 168, the belts may be buckled to the shoulder belt anchors of the vehicle seat belt and tightened, thus securing the child seat 100 to the vehicle seat.

Proper Harness Position Indicators

Figure 23:
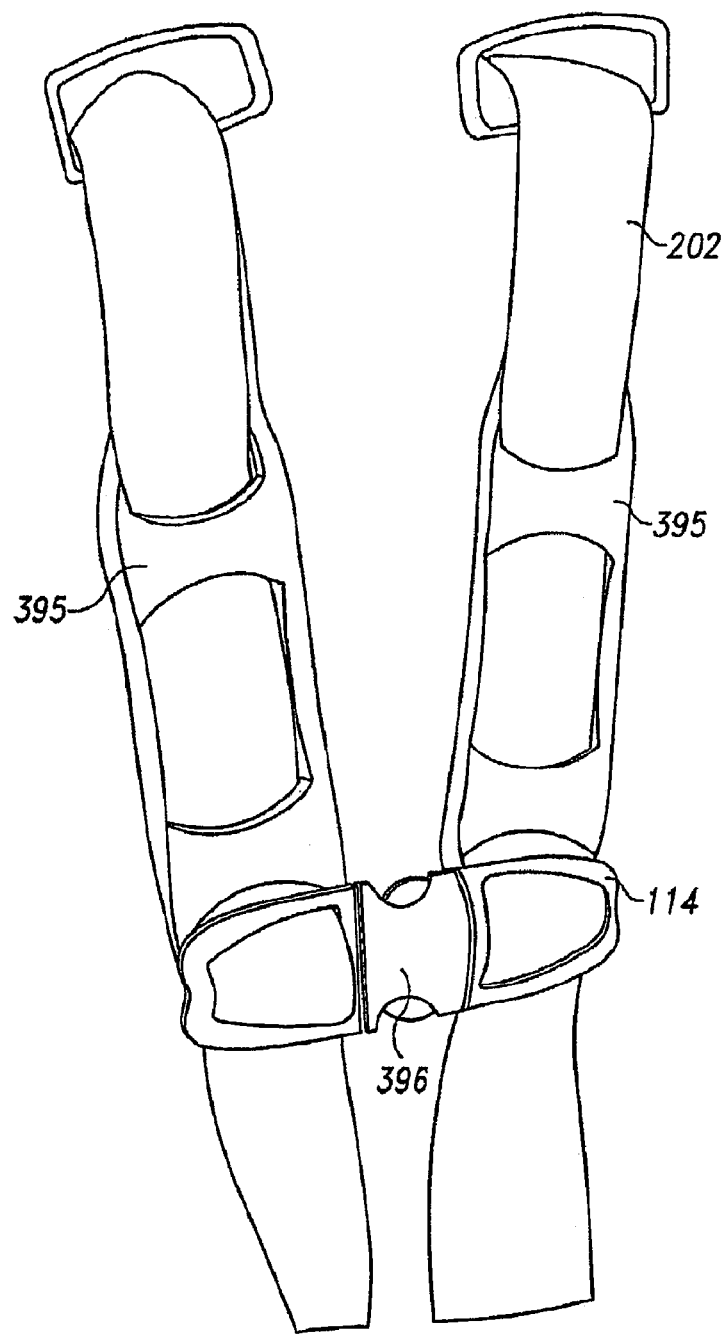
FIG. 23 shows an alternative front perspective view of the shoulder belts of the child vehicle seat of FIG. 13.
Figure 24:
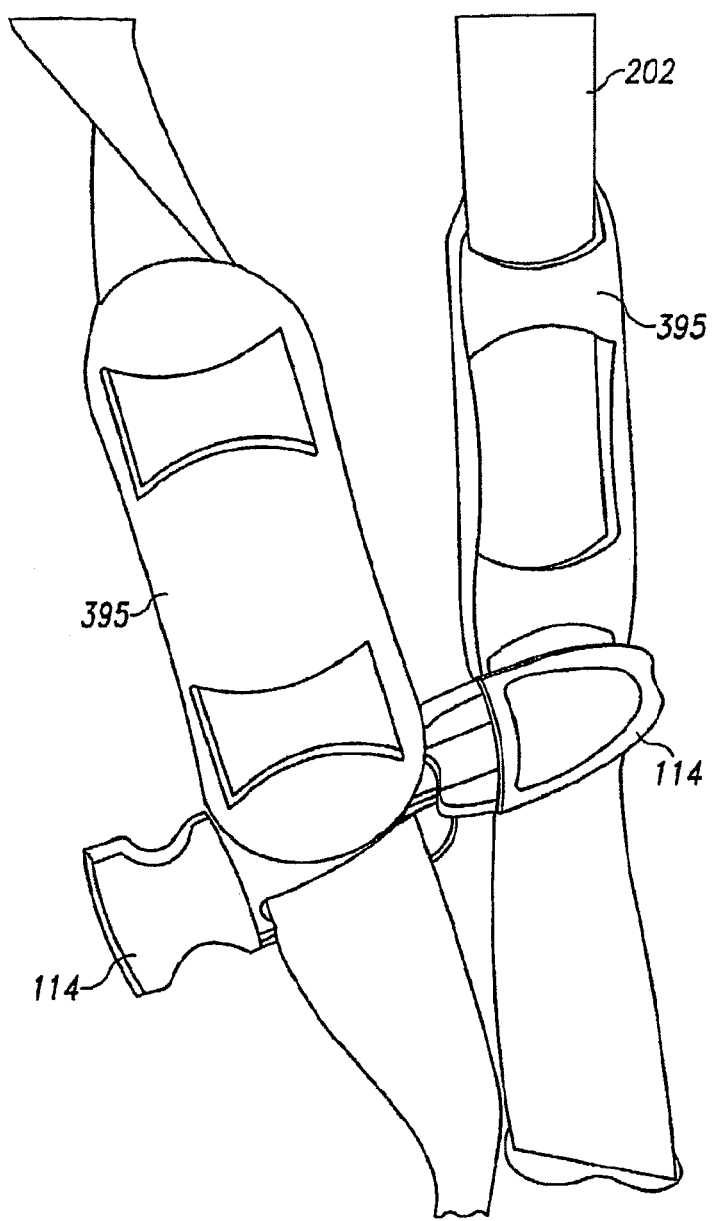
FIG. 24 shows a front perspective view of the shoulder belts and shoulder pads of FIG. 23.

The child seat 100 is equipped with both a clip position indicator and a shoulder slot position indicator. The clip location indicator 396 is provided on the clip itself. The clip position indicator 396 includes a design, icon, wording, or other indicia to show the proper position of the clip relative to the child. For example, as shown in FIG. 23, the clip position indicator includes the words, "Adjust to armpit level." As also shown in FIG. 23, shoulder pads 395 in the form of TPE pads are slideably positioned on the shoulder belts to provide shoulder padding for the child. As shown in FIG. 24, the shoulder pads 395 include a textured surface designed to provide friction against a child's clothing, and thus prevent the TPE pads from slipping on the child when the child is secured in the seat by the harness.

Figure 21A:
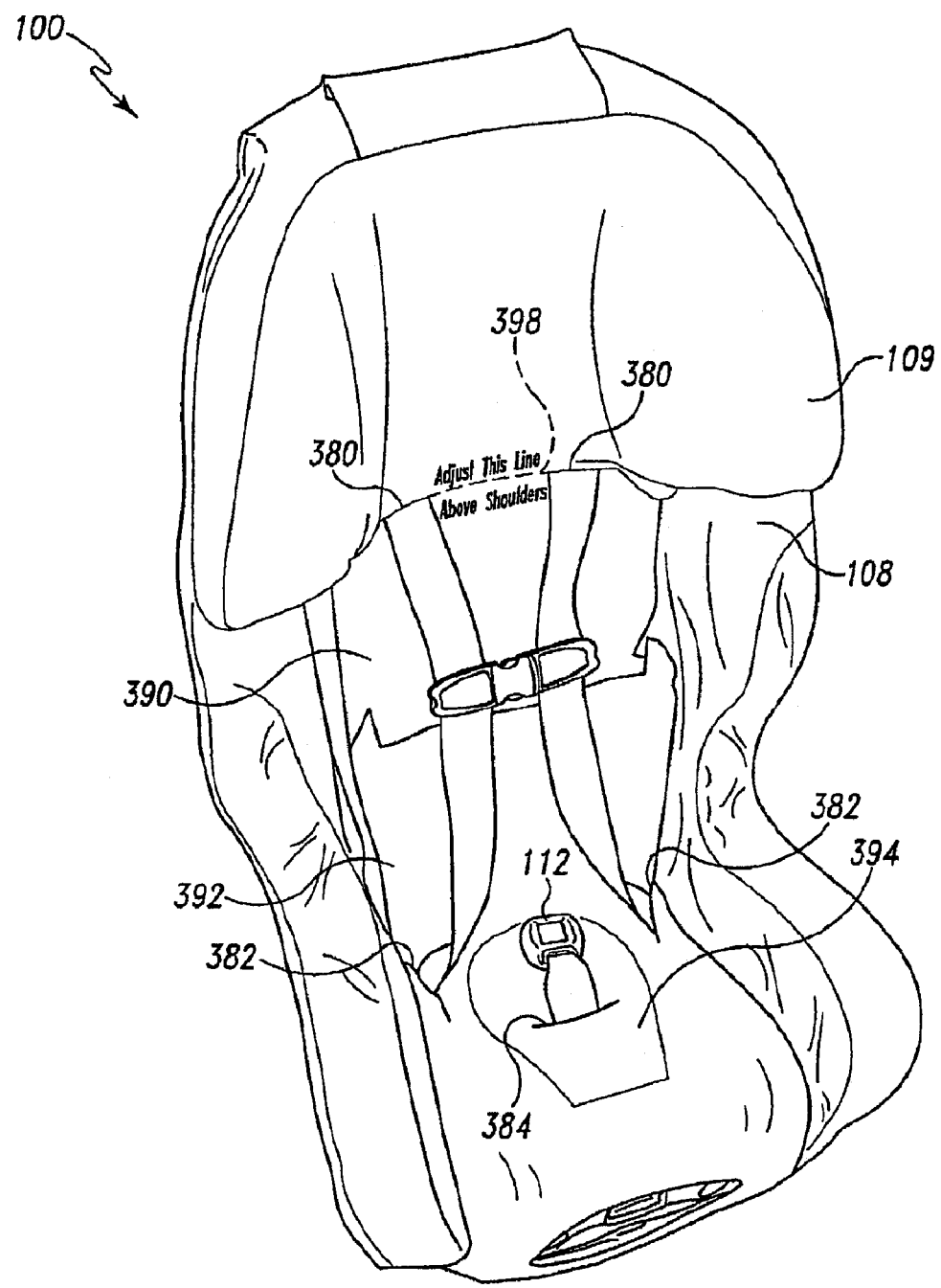
FIG. 21A shows an alternative embodiment of the headrest cover in relation to the headrest cover shown in FIG. 21.

In an alternative embodiment shown in FIG. 21A, the shoulder slot position indicator is provided on the headrest cover 109. The shoulder slot position indicator includes a design, icon, wording, or other indicia to show the proper position of the shoulder slot relative to the child. For example, as shown in FIG. 21A, the shoulder slot position indicator 398 includes a dotted line with words "Adjust this line above shoulders." Together with the automated adjustment features of the child seat, the clip location indicator and the shoulder slot position indicator help the consumer with proper positioning of the seat harness on the child.

Carrying Strap/Tether Combination

With reference to FIG. 25, the child seat 100 includes a tether 500. One end of the tether 500 is secured to an upper posterior cross member on the frame 122 (see FIG. 12). The other end of the tether 500 is connected to a tether clip 502 that may be used to secure the tether 500 to a tether anchor in an automobile. The tether clip includes a hook portion 504 and a buckle portion 506.

Conveniently, the tether 500 may also serve as a carrying strap. To this end, the child seat 100 includes a tether clip connection slot 510 on the posterior side of the base shell 118. The tether clip connection slot 510 is dimensioned to receive the hook portion 504 of the tether clip. Adjacent to the tether clip connection slot is a buckle groove 512 dimensioned to receive the buckle portion 506 of the tether clip 502.

Figure 27:
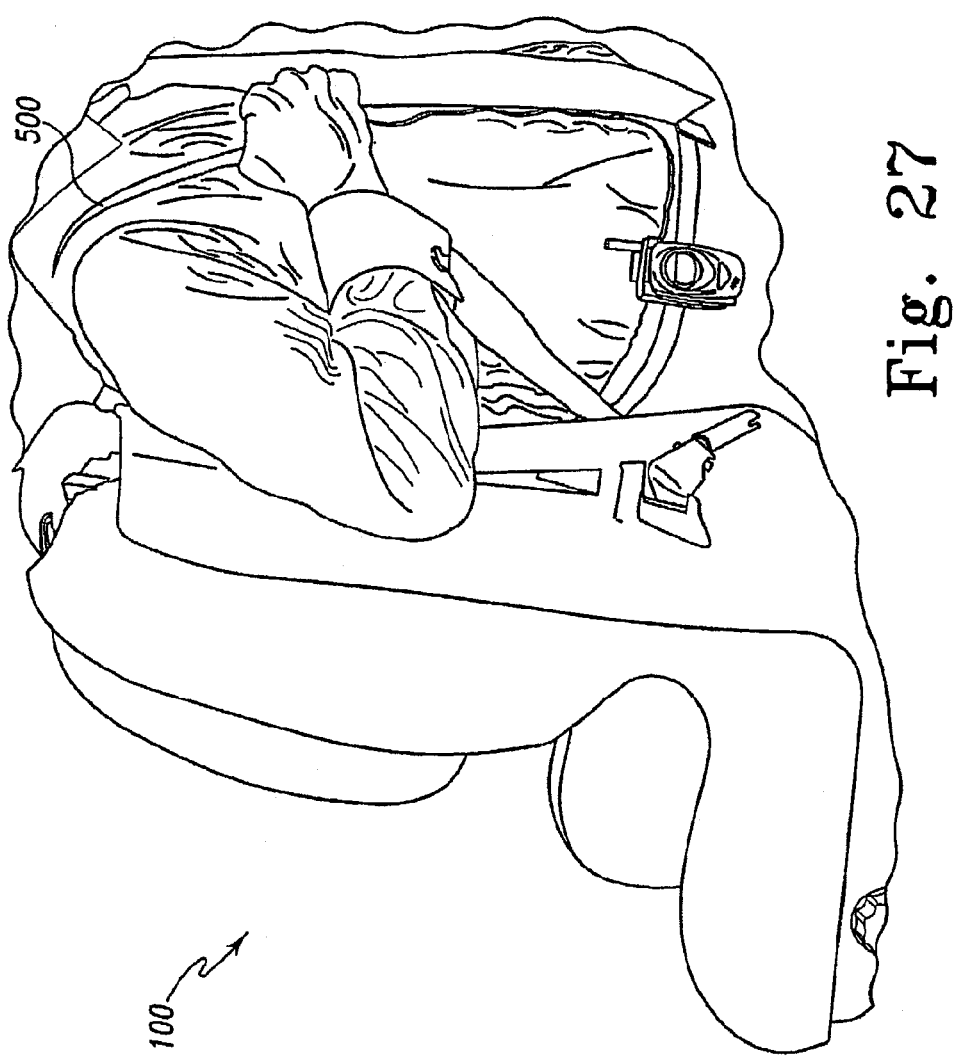
FIG. 27 shows a perspective view of the child vehicle seat of FIG. 25 being carried by a user.

FIG. 25 shows the tether clip connection slot with the tether clip 502 removed from the slot 510. FIG. 26 shows the tether clip connection slot 510 with the hook portion 504 of the tether clip 502 hooked in the slot 510 and the buckle portion 506 of the tether clip positioned in the groove 512. As shown in FIG. 27, when the tether clip 502 is hooked in the slot 512, a user may grab the tether 500 and place it over his or her shoulder as a means for conveniently carrying the child seat in back-pack fashion. The length of the tether/carrying strap 500 may be conveniently adjusted at the buckle portion 506, to accommodate the size of the user.

Instruction Manual Storage

Figure 28:
FIG. 28 shows a top view of the child vehicle seat of FIG. 21.
Figure 29:
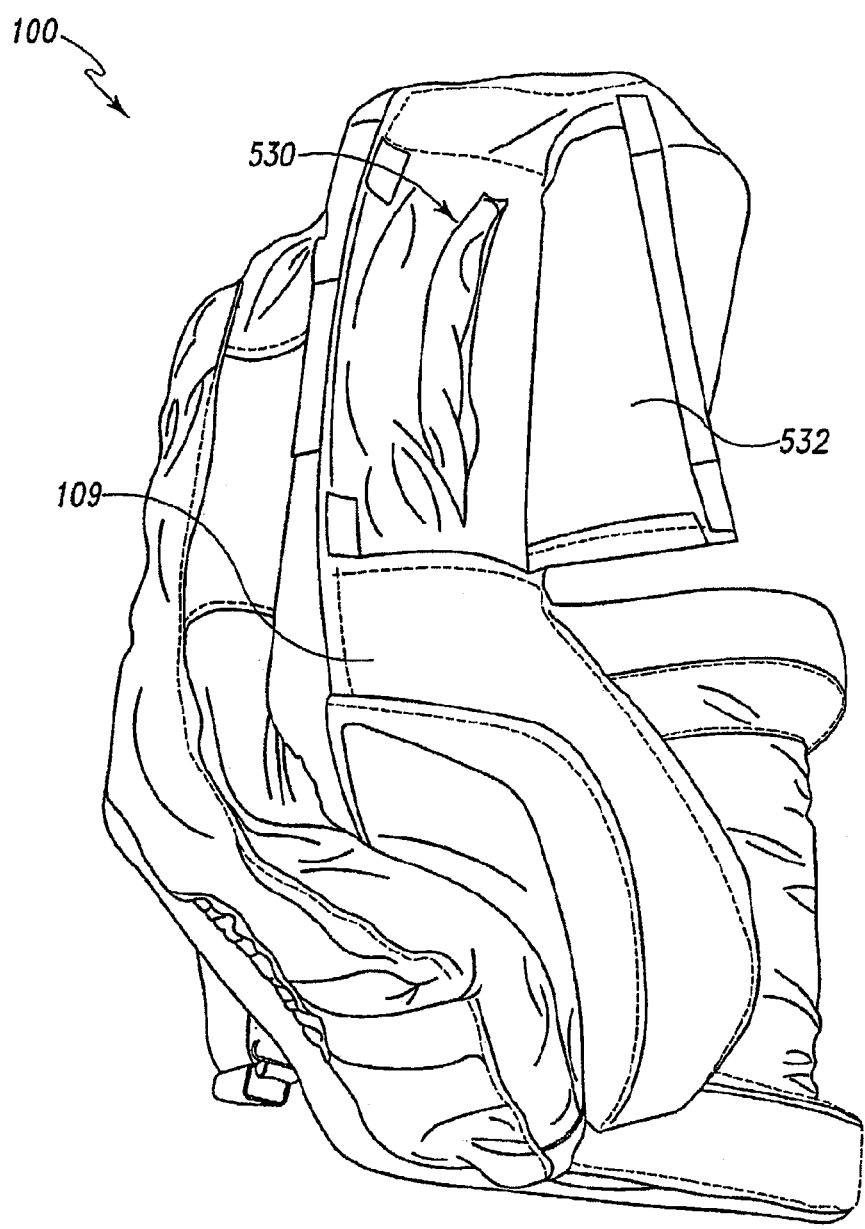
FIG. 29 shows a top perspective view of the child vehicle seat of FIG. 28 with the instruction flap pulled back.

With reference to FIGS. 28 and 29, the child seat 100 includes a pouch 530 built into the headrest cover 109. The pouch 530 in the headrest cover 109 is generally rectangular in shape and is dimensioned to receive the instruction manual for the child seat 100. The pouch 530 is positioned on the top portion of the seat and the opening to the pouch is covered by a flap 532. The flap 532 includes one edge that is fixed to the headrest cover, and an opposing edge that connects to the headrest cover using a fastener, such as a hook and loop fastener. As shown in FIG. 29, pulling the edge of the flap back exposes the opening to the pouch 530 in the headrest cover.

When the headrest cover 109 is properly positioned on the headrest 102, the pouch 530 is situated in front of the foam headrest 102 and behind the exterior surface of the headrest cover 109. Padding may be added between the pouch 530 and the headrest cover 109. The pouch 530 provides a convenient location for storage of the instruction manual, allowing a user of the seat 100 to quickly and conveniently access the instruction manual when needed. This convenient location for storage of the instruction manual also helps the user avoid losing the instruction manual.

Color Coded Parts and Instruction Manual

The instruction manual, seat labels, and various parts of the child seat 100 are all color coded to help the user identify and properly operate different parts on the seat. With reference to FIG. 32, a page 550 from the instruction manual is shown. This page 550 shows the child seat 100 along with various component parts of the child seat. As noted by this page 550 of the instruction manual, portions of the manual and seat 100 color coded in yellow refer to the retractable harness 110 and related components. Other portions of the instruction manual and seat 100 color coded in gray refer to the vehicle connection buckles 280 and related components. Still other portions of the instruction manual and seat 100 color coded in red refer to the vehicle seat belt and components for attaching the seat 100 to the vehicle seat belt. Of course any other color may be substituted for the colors described above such as substituting the color black for the color gray.

As noted above, numerous text references in the instruction manual are highlighted in yellow to indicate to the reader that the text being read is in reference to the retractable harness system 110 of the seat 100. Likewise, numerous parts on the seat 100 are yellow to help the user easily identify and understand proper operation of the retractable harness system when reading about the retractable harness system in the manual. For example, with reference to FIG. 32, the knob 234 and the retraction latch 116 (color not shown) are both yellow in color. Thus, when the reader identifies yellow text in the instruction manual, he or she may easily identify the component parts to which the instruction manual refers for operation of the retractable harness system.

Additional Embodiments Anticipated

The child vehicle seat and restraint system disclosed herein is designed for use in any moving vehicle, including, without limitation, cars, vans, trucks, airplanes, etc. Although the present invention has been described with respect to certain preferred embodiments, it will be appreciated by those of skill in the art that other implementations and adaptations are possible. Moreover, there are advantages to individual advancements described herein that may be obtained without incorporating other aspects described above. Therefore, the spirit and scope of the invention should not be limited to the description of the preferred embodiments contained herein.

What is claimed is:

1. A child vehicle seat, comprising:
   a seat portion and a back portion;
   a headrest assembly movable in relation to said seat portion between an upper position and a lower position; and
   a harness system including:
   (i) a first belt having at least one shoulder belt portion extending forward from said back portion;
   (ii) a crotch belt having a portion that is movable in relation to said seat portion between an extended position and a retracted position; and
   (iii) an adjustment belt;
   wherein said adjustment belt is attached to said headrest assembly and connected to said crotch belt portion whereby movement of said headrest assembly in relation to said seat portion from said upper position to said lower position causes said crotch belt portion to move from said extended position to said retracted position.

2. The child vehicle seat of claim 1, wherein:
   said adjustment belt has a first end portion and a second end portion, and
   said first end portion of said adjustment belt is attached to a portion of said headrest assembly for movement therewith, and
   said second end portion is coupled to said crotch belt.

3. The child vehicle seat of claim 2, wherein: said first end portion of said adjustment belt is attached to a portion of said headrest assembly through a buckle member.

4. The child vehicle seat of claim 3, further comprising:
   a support member positioned below said seat portion, and
   a tether belt having a first end connected to said adjustment belt and a second end connected to said support member.

5. The child vehicle seat of claim 4, wherein:
   a portion of said adjustment belt is located under said support member and said tether and is moved under said support member when said crotch belt is moved from said retracted position to said extended position by said headrest assembly.

6. The child vehicle seat of claim 2, further comprising:
   a first support member connected to said seat portion and positioned below said seat portion, wherein:
   said second end portion of said adjustment belt is connected to said first support member, and
   said crotch belt is movably coupled to said adjustment belt.

7. The child vehicle seat of claim 6, wherein:
   a connector is attached to said crotch belt, and the connector has a passage defined therein, and
   said adjustment belt extends through said passage.

8. The child vehicle seat of claim 1, wherein:
   said first belt has a second shoulder belt portion extending forward from said back portion, and
   said first belt has a first end and a second end.

9. The child vehicle seat of claim 8, wherein:
   said harness system further includes a connector,
   said first end of said first belt is attached to a first portion of said connector, and
   said second end of said first belt is attached to a second portion of said connector.

10. The child vehicle seat of claim 9, further comprising:
    a belt retractor and a coupling belt, wherein:
    said coupling belt is secured to said connector,
    said retractor is configured to receive said coupling belt in a wound configuration; whereby
    said retractor is operable to pull said shoulder belt portions to tighten said harness system.

11. The child vehicle seat of claim 10, further comprising:
    a buckle on said crotch belt,
    two buckle tongues on said first belt,
    one of said buckle tongues located on said first shoulder belt portion,
    the other buckle tongue located on said second shoulder belt portion, and
    said tongues being lockably receivable in said buckle to connect said shoulder belt portions to said crotch belt.

12. The child vehicle seat of claim 11, wherein:
    said first belt extends from said one buckle tongue through and under said seat portion and up though said seat portion to said other buckle tongue.

13. A child vehicle seat, comprising:
    a seat portion;
    a headrest assembly movable in relation to said seat portion between an upper position and a lower position; and
    a harness system including:
    (i) a crotch belt that has a portion movable in relation to said seat portion between an extended position and a retracted position; and
    (ii) an adjustment belt;
    wherein said adjustment belt is attached to said headrest assembly and connected to said crotch belt portion whereby movement of said headrest assembly in relation to said seat portion from said upper position to said lower position causes said crotch belt portion to move from said extended position to said retracted position.

14. The child vehicle seat of claim 13, wherein:
    said adjustment belt includes a first end portion and a second end portion, and
    said first end portion of said adjustment belt is attached to said headrest assembly for movement therewith, and
    said crotch belt portion is attached to a first buckle member.

15. The child vehicle seat of claim 14, and further comprising:
    at least one shoulder belt, and
    wherein a second buckle member is movably secured to said at least one shoulder belt, and
    said first buckle member and said second buckle member are configured to couple to each other.

16. The child vehicle seat of claim 15, and further comprising:
    at least one belt aperture in said headrest assembly, and
    wherein said at least one shoulder belt has a portion extending through said aperture, and
    wherein movement of said headrest assembly in relation to said seat portion from said upper position to said lower position causes said at least one shoulder belt portion to move through said at least one belt aperture.

17. The child vehicle seat of claim 13, further comprising:
    a support member positioned below said seat portion, and
    a tether belt having (i) a first end connected to said crotch belt, and (ii) a second end connected to said support member.

18. The child vehicle seat of claim 13, further comprising a belt retractor and a coupling belt, wherein:
    said retractor is operable to move said coupling belt, and
    said coupling belt is attached to said at least one shoulder belt.

* * * * *